US012637537B2

(12) United States Patent
Zhang et al.

(10) Patent No.: US 12,637,537 B2
(45) Date of Patent: May 26, 2026

(54) AMBIENT TEMPERATURE CURABLE COATING AND USES THEREIN

(71) Applicant: WASHINGTON STATE UNIVERSITY, Pullman, WA (US)

(72) Inventors: Jinwen Zhang, Pullman, WA (US); Tuan Liu, Pullman, WA (US)

(73) Assignee: Washington State University, Pullman, WA (US)

( * ) Notice: Subject to any disclaimer, the term of this patent is extended or adjusted under 35 U.S.C. 154(b) by 305 days.

(21) Appl. No.: 18/005,209

(22) PCT Filed: Jul. 13, 2021

(86) PCT No.: PCT/US2021/041383
§ 371 (c)(1),
(2) Date: Jan. 12, 2023

(87) PCT Pub. No.: WO2022/015701
PCT Pub. Date: Jan. 20, 2022

(65) Prior Publication Data

US 2023/0323016 A1 Oct. 12, 2023

Related U.S. Application Data

(60) Provisional application No. 63/052,081, filed on Jul. 15, 2020.

(51) Int. Cl.
*C08G 59/32* (2006.01)
*C08G 59/24* (2006.01)
(Continued)

(52) U.S. Cl.
CPC ..... *C08G 59/3218* (2013.01); *C08G 59/3227* (2013.01); *C08G 59/5006* (2013.01); *C08G 2150/00* (2013.01)

(58) Field of Classification Search
None
See application file for complete search history.

(56) References Cited

U.S. PATENT DOCUMENTS

2015/0344816 A1* 12/2015 Zhang ..................... C07C 69/73 554/102
2020/0097314 A1 3/2020 Xie et al.

FOREIGN PATENT DOCUMENTS

CN 102977828 A * 3/2013
CN 104559813 A * 4/2015
(Continued)

OTHER PUBLICATIONS

Bian et al., "Effects of Polarity Groups on Mechanical and Seawater Sorption Properties of Epoxy Matrixes," Journal of National University of Defense Technology, vol. 33, No. 4, pp. 55-59 (2011) (Year: 2011).*
(Continued)

*Primary Examiner* — Ha S Nguyen
(74) *Attorney, Agent, or Firm* — WCF IP

(57) ABSTRACT

Disclosed is a novel room-temperature curable bio-based epoxy vitrimer with a simple design of the chemical structure. A hempseed oil-derived glycidyl ester type epoxy (HOEP) was synthesized and then blended with a bisphenol A epoxy (DER331) to manipulate the properties of the resulting vitrimer s. An aliphatic amine hardener, diethylenetriamine (DETA), was selected as hardener to realize the room temperature curing in presence of triethanolamine (TEOA) as the catalyst. Unlike the traditional glycidyl ether epoxy-amine the thermosets which are based on sable C—N and ether linkages, the epoxy vitrimer herein includes ester bonds with HOEP and hydroxyls formed from the reaction of amine and epoxy in its cross-linked network. Dynamic transesterification (DTER) between the ester bonds and hydroxyls take place at elevated temperatures, imparting the
(Continued)

vitrimer significant stress relaxation behavior and repairability. This provided a viable method to produce room temperature curable epoxy vitrimer s.

17 Claims, 12 Drawing Sheets

(51) Int. Cl.
*C08G 59/50* (2006.01)
*C09D 163/00* (2006.01)

(56) References Cited

FOREIGN PATENT DOCUMENTS

| | | | |
|---|---|---|---|
| CN | 108794983 | A | * 11/2018 |
| JP | 05295083 | A | * 11/1993 |
| WO | 2020097314 | A1 | 5/2020 |

OTHER PUBLICATIONS

Demongeot et al.: "Coordination and catalysis on Zn 2+ in epoxy-based vitrimers" Polymer Chemistry, vol. 7, No. 27, p. 4486-4493, 2016.
Ellahi et al: "Study of Effects of Epoxy Resin Based PDLC Films Using Triethanolamine (TEA) as Catalyst", Proceedings of AMPE, p. 149-157, 2016.
Matejka et al: "Curing epoxy resins with amines", Polymer Bulletin, vol. 14, p. 309-315, 1985.
Matějka et al., "Curing of Epoxy Resins with Amines Gelation of Polyepoxides Derived from Diglycidylaniline," Polymer Bulletin 14:309-315, 1985.
Guangyu Li et al., "New Technology of Adhesion and Sealing," National Defense Industry Press, p. 51, Jan. 2006.

* cited by examiner

Digycidyl succinate

Diglycidyl 1,2-cyclohexanedicarboxylate

Digycidyl terephthalate

Digycidyl 4,5-epoxytetrahydrophthalate

Diglycidylester of acrylopimaric acid

Triglycidylester of fatty acid

Diglycidylester of dimer acid

Diglycidyl 1,2,3,6-tetrahydrophthalate

Bisphenol F diglycidyl ether

Bisphenol A diglycidyl ether

Epoxycresol novolak

Poly(ethylene glycol) diglycidyl ether

Poly(propylene glycol) diglycidyl ether 1,4-butanediol diglycidyl ether

N,N-diglycidylaniline

N,N-Diglycidyl-4-glycidyloxyaniline 4,4'-Methylenebis(N,N-diglycidylaniline)

Triethylenetetramine

Ethylenediamine

Diethylenetriamine

Tris(2-aminoethyl)amine

AMBIENT TEMPERATURE CURABLE COATING AND USES THEREIN

STATEMENT OF GOVERNMENT INTEREST

This invention was made with government support under Grant/Contract Numbers ED17HDQ0200094, awarded by the Economic Development Administration. The government has certain rights in the invention.

BACKGROUND

Technical Field

This disclosure generally relates to a novel coating in addition to a method for developing the coating.

Description of the Related Art

Thermosetting polymer coatings are widely used in surface protection, surface functionalization and/or decoration for various products. It is desirable to enable these coatings self-repairability which are not attainable for the traditional cross-linked network structures of polymers. Introduction of dynamic covalent linkages into the network structure may impart the self-repairability to the cross-linked polymers. Effective dynamic transesterification reaction (DTER) in anhydride or carboxylic acid cured epoxy vitrimers has been demonstrated when the network structure contains sufficient —OH groups and ester bonds. However, curing of the epoxy-anhydride or epoxy carboxylic acid system requires elevated temperature. Curing of glycidyl ether epoxy and aliphatic amine can take place at ambient temperature and the resulting possesses abundant —OH groups and tertiary amines, however, the DTER cannot take place due to the lack of ester bonds in the system.

On the other hand, commercial epoxy resins are derived from petrochemicals which are nonrenewable. Preparation of alternative epoxies from renewable feedstocks such as vegetable oils has received extensive investigations. Many of these alternative epoxies are glycidyl ester epoxies or contains ester bonds. In addition, fatty acids or their derivatized carboxylic products can be used as curing agents as well. However, the resulting vitrimers generally exhibit low glass transition temperatures due to the flexible backbone structures. These issues make them not suitable for room temperature coatings and leave room for improvements within this field.

BRIEF SUMMARY

One embodiment provides a repairable epoxy vitrimer resin that can include a glycidyl ester epoxy; and/or a glycidyl ether epoxy; and/or a glycidyl amine epoxy; and an aliphatic amine hardener; and/or a catalyst.

The foregoing and other objects, features, and advantages of the present disclosure will become more apparent from the following detailed description, which proceeds with reference to the accompanying figures.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

Figure 1:
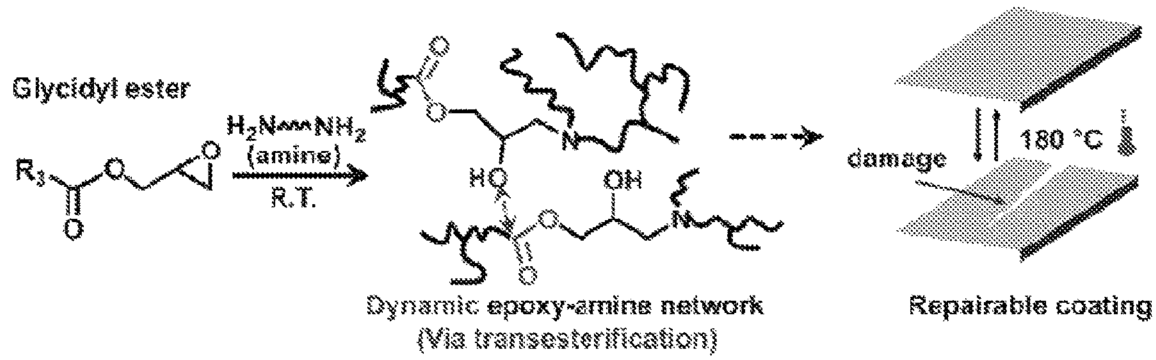
FIG. 1 shows the schematic for the preparation of ambient temperature curable epoxy vitrimer and repairing.
Figure 2:
FIG. 2 shows the dynamic transesterification (DETR) in epoxy vitrimer which enables the reconstruction of the cross-linked network and provides repairability to the cured materials. An efficient DTER only happens within the cross-linked network with abundant ester bonds and hydroxyl groups.
Figure 3:
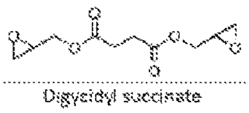
FIG. 3 shows the chemical structures of some examples of glycidyl ester epoxies that have epoxy groups and ester bonds in structure.
Figure 3:
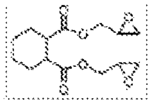
Figure 3:
Figure 3:
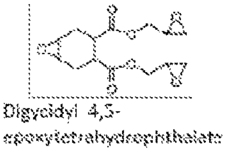
Figure 3:
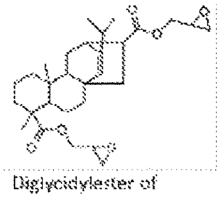
Figure 3:
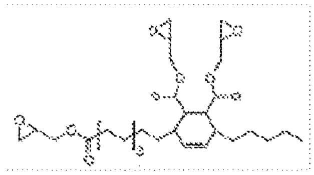
Figure 3:
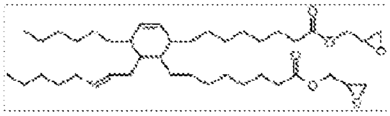
Figure 3:
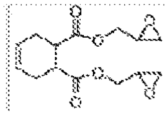
Figure 4:
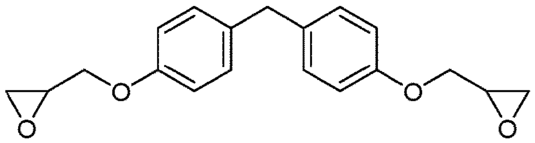
FIG. 4 shows the chemical structures of some examples of glycidyl ether epoxies that have epoxy groups and ether bonds in structure.
Figure 4:
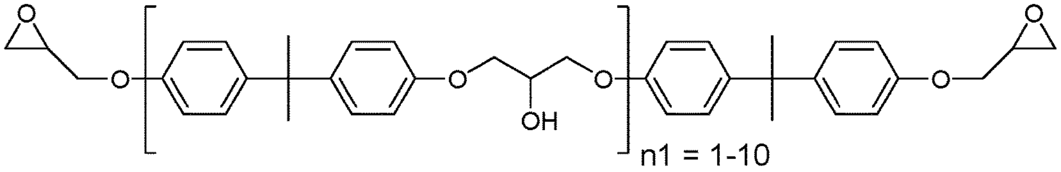
Figure 4:
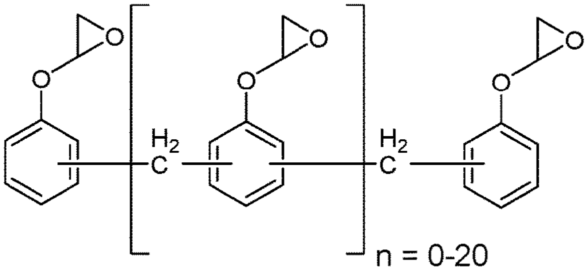
Figure 4:
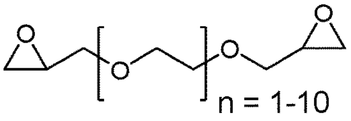
Figure 4:
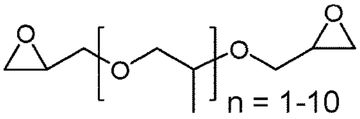
Figure 4:
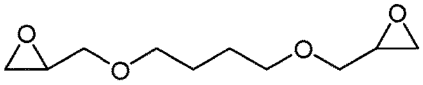
Figure 5:
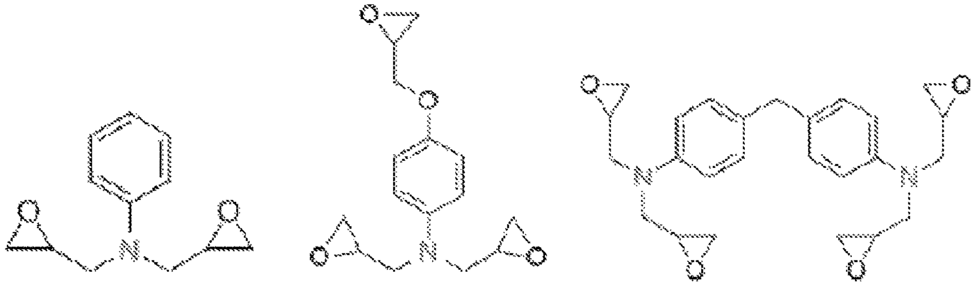
FIG. 5 shows the chemical structures of some examples of glycidyl amine epoxies that have epoxy groups and tertiary amines in structure.
Figure 6:
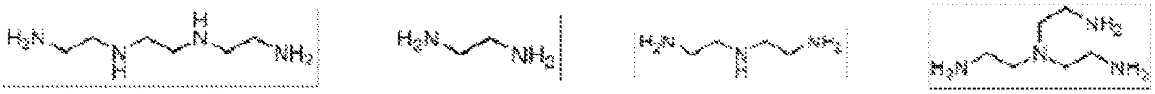
FIG. 6 shows the chemical structures of some examples of aliphatic amine hardeners that have at least 3 active hydrogens in structure.

The following are definitions of terms that may be used in the present specification. The initial definition provided for a group or term herein applies to that group or term throughout the present specification individually or as part of another group, unless otherwise indicated.

Additionally, it will be understood that any list of such candidates or alternatives is merely illustrative, not limiting, unless implicitly or explicitly understood or stated otherwise.

As used in this specification and the appended claims, the singular forms "a," "an" and "the" include plural referents unless the content clearly dictates otherwise.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, an "epoxy group," "epoxide," "epoxide group," or grammatical equivalents refer to a chemical moiety having the following structure:

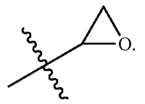 [SMILES: *C1CO1]

When referencing a compound, the term "epoxy" means a compound that comprises the above-noted chemical moiety. For example, a glycidyl ester epoxy refers to a glycidyl ester having at least one chemical moiety having the following structure:

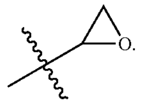 [SMILES: *C1CO1]

"Glycidyl ester epoxy" refers to a chemical having the general structure:

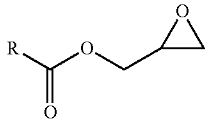

wherein R is a radical comprising carbon and various functional groups including, but not limited to, additional ester groups, ether groups, epoxide groups, aryl groups, alkyl groups, cycloalkyl groups, cycloalkenyl groups, heterocyclyl groups, and the like.

As used herein, an "active hydrogen" is a hydrogen that is part of a functional group such as —OH, $—NH_2$, —NH—, $—NH—NH_2$, —SH, and the like.

"Alkylene" refers to a straight divalent hydrocarbon chain linking the rest of the molecule to a radical group (e.g., another portion of the molecule), consisting solely of carbon and hydrogen, containing no unsaturation, and preferably having from one to twelve carbon atoms, for example, methylene, ethylene, propylene, butylene, and the like. The alkylene chain is attached to the rest of the molecule through a single bond and to the radical group through a single bond. The points of attachment of the alkylene chain to the rest of the molecule and to the radical group are through the terminal carbons respectively. Unless stated otherwise specifically in the specification, an alkylene chain is optionally substituted by one or more substituents.

The term "cycloalkylene" refers to a divalent saturated ring linking the rest of the molecule to a radical group (e.g., another portion of the molecule), in which each atom of the ring is carbon. Cycloalkylene may include monocyclic and polycyclic rings such as 3-to 10-membered monocyclic rings, 6- to 12-membered bicyclic rings, and 6- to 12-membered bridged rings. In certain embodiments, a cycloalkylene comprises three to ten carbon atoms. In other embodiments, a cycloalkylene comprises five to seven carbon atoms. The cycloalkylene may be attached to the molecule through a single bond and to the radical group through a single bond. Examples of monocyclic cycloalkylenes include, e.g., cyclopropylene, cyclobutylene, cyclopentylene, cyclohexylene, cycloheptylene, and cyclooctylene. Polycyclic cycloalkylenes include, for example, adamantylene, norbornylene (i.e., bicyclo[2.2.1]heptanylene), decalinylene, 7,7 dimethyl bicyclo[2.2.1]heptanylene, and the like. Unless otherwise stated specifically in the specification, the term "cycloalkylene" is meant to include cycloalkylene moieties that are optionally substituted by one or more substituents.

The term "cycloalkenylene" refers to a moiety comprising a divalent saturated ring linking the rest of the molecule to a radical group (e.g., another portion of the molecule), in which each atom of the ring is carbon and there is at least one double bond between two ring carbons. Cycloalkenylene may include monocyclic and polycyclic rings such as 3- to 10-membered monocyclic rings, 6- to 12-membered bicyclic rings, and 6- to 12-membered bridged rings. In other embodiments, a cycloalkenylene comprises five to seven carbon atoms. The cycloalkenylene may be attached to the molecule through a single bond and to the radical group through a single bond. Examples of monocyclic cycloalkenylenes include, e.g., cyclopentenylene, cyclohexenylene, cycloheptenylene, and cyclooctenylene. Unless otherwise stated specifically in the specification, the term "cycloalkenylene" is meant to include cycloalkenylene moieties that are optionally substituted by one or more substituents. In one specific embodiment, the cycloalkenylene has one of the following structures:

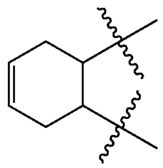 ; 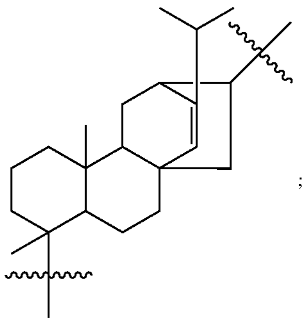 ;

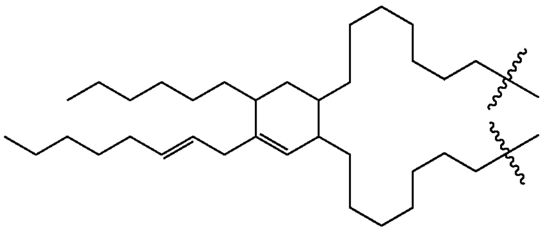 or

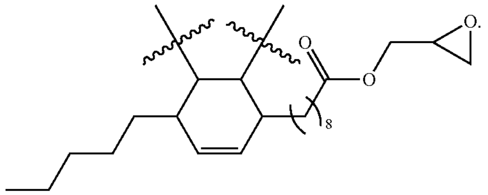

"Arylene" refers to a divalent aromatic monocyclic or divalent aromatic multicyclic hydrocarbon ring system linking the rest of the molecule to a radical group (e.g., another portion of the molecule). The aromatic monocyclic or aromatic multicyclic hydrocarbon ring system contains only hydrogen and carbon and from five to eighteen carbon atoms, where at least one of the rings in the ring system is aromatic, i.e., it contains a cyclic, delocalized (4n+2) π-electron system in accordance with the Hückel theory. The ring system from which arylene groups are derived include, but are not limited to, groups such as benzene, fluorene, indane, indene, tetralin and naphthalene. Unless stated otherwise specifically in the specification, the term "arylene" is meant to include arylene moieties optionally substituted by one or more substituents. Exemplary arylene groups have the following structures:

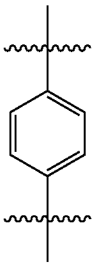 ; 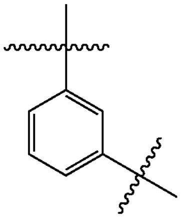 ; 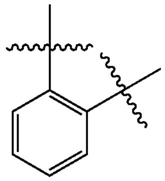 ;

-continued

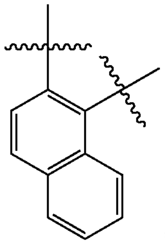 ; 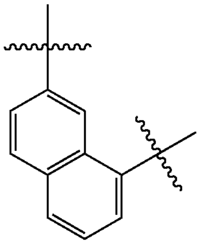 ;

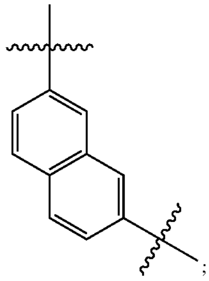 ; 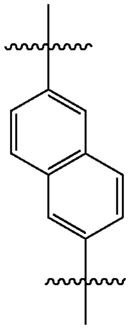 , and the like. It is understood that the above-noted arylene structures are shown in their unsubstituted form, but they may be substituted by one or more substituents.

"Heterocyclylene" refers to a divalent saturated, unsaturated, or aromatic ring comprising one or more heteroatoms that links the rest of the molecule to a radical group (e.g., another portion of the molecule). Exemplary heteroatoms include N, O, Si, P, B, and S atoms. Heterocyclylenes include 3- to 10-membered monocyclic rings, 6- to 12-membered bicyclic rings, and 6- to 12-membered bridged rings. A bicyclic heterocyclylene includes any combination of saturated, unsaturated, aromatic, and bicyclic rings, as valence permits. In an exemplary embodiment, an aromatic ring, e.g., pyridyl, may be fused to a saturated or unsaturated ring, e.g., cyclohexane, cyclopentane, morpholine, piperidine, or cyclohexene. A bicyclic heterocyclylene includes any combination of ring sizes such as 4-5 fused ring systems, 5-5 fused ring systems, 5-6 fused ring systems, 6-6 fused ring systems, 5-7 fused ring systems, 6-7 fused ring systems, 5-8 fused ring systems, and 6-8 fused ring systems. Unless stated otherwise specifically in the specification, the term "heterocyclylene" is meant to include heterocyclylene moieties optionally substituted by one or more substituents. In one specific embodiment, the heterocyclylene has the following structure:

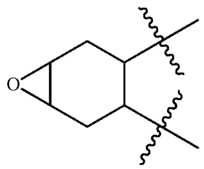 [SMILES: *C1CC2OC2CC1*]

In some embodiments, a compound structure drawing with the following structural component:

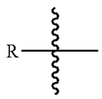

denotes a connection to a portion of a molecule (e.g., a polymer) wherein R is a substructure thereof. That is, the wavy or curvy line denotes a connection of that the substructure (in this case R) to the remainder of a molecule that may comprise additional molecular features or moieties. In some embodiments, the remainder of the molecule (e.g., a polymer) comprises moieties that are derived from monomer inputs (e.g., glycidyl esters epoxies, glycidyl ether epoxies, etc.) described herein.

In addition, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

Ambient temperature curable epoxies (RTEs) have been widely used for coatings, adhesives, and matrix resins for composite materials. Most of the RTEs are based on the room temperature curable glycidyl ether epoxy-aliphatic amine hardener system due to their convenient processability and low manufacturing cost. During curing, each active hydrogen of the amine curing agent is capable of reacting with one epoxy group to form a stable C—N bond and a hydroxyl (—OH) group. The abundant polar —OH groups promote strong adhesion between polymer and substrate, and the use of curing agent with high amine value enables the formation of high cross-link density network that displays excellent chemical resistance and dimensional stability. However, the permanent and stable cross-linked network also makes the cured epoxy not easily repairable. To extend the service life and reduce the waste and cost, it is desirable to develop repairable and room temperature curable epoxies.

Dynamic covalent chemistry provides a likely solution to address the un-repairability of cross-linked polymers. Vitrimers are a class of cross-linked polymers that consist of dynamic covalent bonds, and they behave like conventional thermosets at service temperature but can undergo topological changes at elevated temperature owing to interchange reactions of the dynamic covalent bonds. Therefore, vitrimers exhibit certain degrees of repairability and malleability. A variety of dynamic covalent bonds, such as hydroxyl-ester (transesterification), imine, disulfide, siloxane, etc., have been introduced to the cross-linked network of epoxy materials. Among them, hydroxyl-ester is the most studied dynamic covalent bond, as it commonly presents in the epoxy-acid and epoxy-anhydride curing systems that are widely used in epoxy industry, and hydroxyl-ester linkages exhibit better thermal and chemical resistance than the other dynamic covalent bonds.

Some epoxy vitrimers reported in the literatures with hydroxyl-ester linkages exhibit excellent dimensional stability, mechanical properties and satisfactory repairability. However, the technology of room temperature curable epoxy vitrimers has not been introduced. This is because both the epoxy-acid and epoxy-anhydride systems require curing at elevated temperature.

One embodiment disclosed herein is a simple method for the preparation of room temperature curable epoxy vitrimer using a glycidyl ester epoxy as the sole epoxy monomer or as an epoxy co-monomer and an aliphatic amine hardener. The resulting cross-linked network possesses abundant ester bonds, hydroxyl groups, and tertiary amines which can undergo dynamic transesterification reactions at elevated temperatures and displays typical vitrimer behaviors such as stress relaxation and reparability to the cured resin. The developed room temperature curable epoxy vitrimers in this disclosure are suitable for a variety of applications, such as coatings, adhesives and matrices as well.

Resin Composition

Accordingly, one embodiment provides a repairable and ambient curable vitrimer resin comprising a glycidyl ester epoxide and an aliphatic amine hardener. One embodiment provides a resin composition comprising a glycidyl ester epoxide and an aliphatic amine hardener.

In some embodiments, the resin composition further comprises a glycidyl ether epoxy, a glycidyl amine epoxy, a catalyst, or combinations thereof. In some embodiments, the resin composition further comprises a glycidyl ether epoxy. In some other embodiments, the resin composition further comprises a glycidyl amine epoxy. In some other embodiments, the resin composition further comprises a catalyst. In some embodiments, the composition comprises an aliphatic amine hardener and a catalyst. In some embodiments, the resin composition further comprises a glycidyl ether epoxy and a glycidyl amine epoxy. In some embodiments, the resin composition further comprises a glycidyl ether epoxy and a catalyst. In some embodiments, the resin composition further comprises a glycidyl ether epoxy, an aliphatic amine hardener, and a catalyst. In some embodiments, the resin composition further comprises a glycidyl amine epoxy and a catalyst. In some embodiments, the resin composition further comprises a glycidyl amine epoxy, an aliphatic amine hardener, and a catalyst. In some embodiments, the resin composition further comprises a glycidyl ether epoxy, a glycidyl amine epoxy, and a catalyst. In some embodiments, the resin composition further comprises a glycidyl ether epoxy, a glycidyl amine epoxy, an aliphatic amine hardener, and a catalyst. In some embodiments, the aliphatic amine hardener and the catalyst to two separate and distinct chemicals. In some embodiments, the resin composition comprises an aliphatic amine hardener and a catalyst.

In certain embodiments, the glycidyl ether epoxy has one of the following structures:

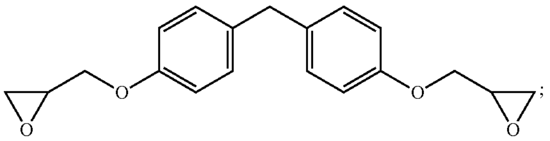

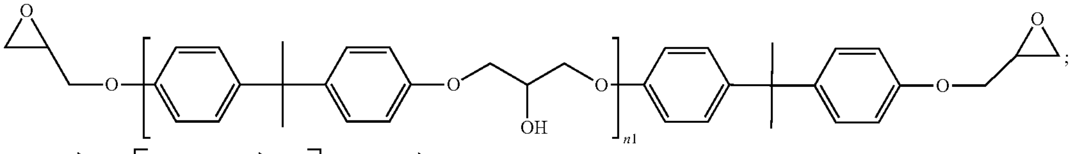

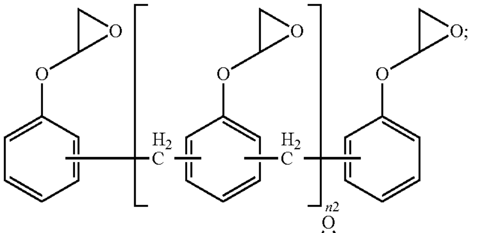

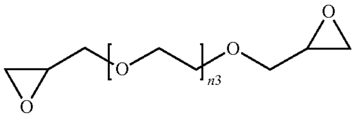
;

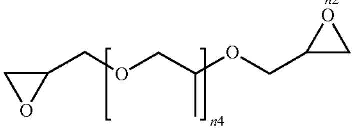
or
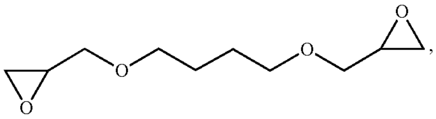
, wherein:

n1 is an integer from 0-10;

n2 is an integer from 0-20;

n3 is an integer from 1-10; and n4 is an integer from 1-10.

In certain embodiments, the glycidyl ether epoxy comprises bisphenol A diglycidyl ether, bisphenol F diglycidyl ether, epoxy cresol novolak, poly(ethylene glycol) diglycidyl ether, poly(propylene glycol) diglycidyl ether, 1,4-butanediol diglycidyl ether, and combinations thereof.

In some embodiments, the glycidyl amine epoxy has one of the following structures:

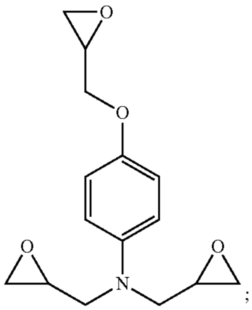
;
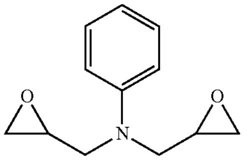
or
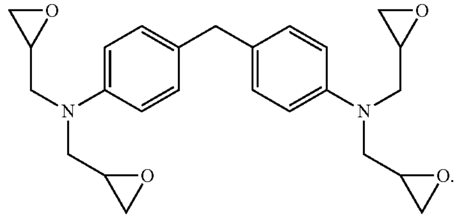

In some embodiments, the glycidyl amine epoxy comprises N,N-diglycidylaniline, N,N-diglycidyl-4-glycidyloxyaniline, 4,4'-methylenebis(N,N-diglycidylaniline), and combinations thereof.

In some embodiments, the glycidyl ester epoxy has at least 2 epoxy groups. In some more specific embodiments, the glycidyl ester epoxy has 2 epoxy groups. In more specific embodiments, the glycidyl ester epoxy has 3 epoxy groups.

In certain embodiments, the glycidyl amine epoxy has at least 2 epoxy groups. In more specific embodiments, the glycidyl amine epoxy has 2 epoxy groups. In certain more specific embodiments, the glycidyl amine epoxy has 3 epoxy groups.

In another embodiment, the resin composition further comprises a glycidyl ether epoxy that has at least 2 epoxy groups. In more specific embodiments, the glycidyl ether epoxy has 2 epoxy groups. In certain more specific embodiments, the glycidyl ether epoxy has 3 epoxy groups.

In another embodiment, the aliphatic amine hardener that has at least 3 active hydrogens. In a more specific embodiment, the aliphatic amine hardener comprises at least one moiety selected from the group consisting of —OH, —$NH_2$, —NH—, —NH—$NH_2$, —SH, and combinations thereof. In some embodiments, the aliphatic amine hardener comprises at least one —OH moiety. In some embodiments, the aliphatic amine hardener comprises at least one —$NH_2$ group. In some embodiments, the aliphatic amine hardener comprises at least two —$NH_2$ groups.

One specific embodiment provides a resin composition comprising a glycidyl ester epoxy having the following structure:

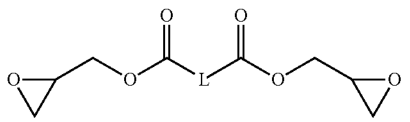

wherein:

L comprises an alkylene, a cycloalkylene, a cycloalkenylene, arylene, or heterocyclylene; and an aliphatic amine hardener comprising a compound having the following structure:

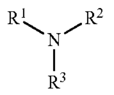

wherein:

$R^1$, $R^2$, and $R^3$ are each independently hydrogen, $-(CH_2)_nNH_2$, or $-(CH_2)_n-NH-(CH_2)_m-NH_2$, provided that one of $R^1$, $R^2$ and $R^3$ is not hydrogen n is 1, 2, or 3; and m is 1, 2, or 3.

In some embodiments, the aliphatic amine hardener comprises a compound having the following structure:

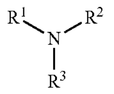

wherein:

$R^1$, $R^2$, and $R^3$ are each independently hydrogen, $-(CH_2)_nNH_2$, or $-(CH_2)_n-NH-(CH_2)_m-NH_2$, provided that one of $R^1$, $R^2$ and $R^3$ is not hydrogen n is 1, 2, or 3; and m is 1, 2, or 3.

In some embodiments, the aliphatic amine hardener has the following structure:

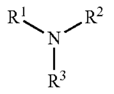

wherein:

$R^1$, $R^2$, and $R^3$ are each independently hydrogen, $-(CH_2)_nNH_2$, or $-(CH_2)_n-NH-(CH_2)_m-NH_2$, provided that one of $R^1$, $R^2$ and $R^3$ is not hydrogen n is 1, 2, or 3; and m is 1, 2, or 3.

In some more specific embodiments, the aliphatic amine hardener is triethylenetetramine, ethylenediamine, diethylenetriamine, tris-(2-aminoethyl)amine, or combinations thereof. In some more specific embodiments, aliphatic amine hardener is triethylenetetramine. In more specific embodiments, the aliphatic amine hardener is ethylenediamine. In more specific embodiments, the aliphatic amine hardener is diethylenetriamine. In more specific embodiments, the aliphatic amine hardener is tris-(2-aminoethyl) amine.

In some embodiments, the aliphatic amine hardener comprises triethylenetetramine, ethylenediamine, diethylenetriamine, tris(2-aminoethyl)amine, aliphatic, isophorone diamine, a Jeffamine® (e.g., M-600, M-2005, M-1000, M-2070, M-2070, M-2095, M-3085, D-230, D-400, D-2000, D-2010, D-4000, ED-600, ED-900, ED-2003, EDR-148, THF-100, THF-170, T-403, T-3000, T-5000, SD-2001, D-205, or RFD-270), or combinations thereof. In some embodiments, the aliphatic amine hardener comprises various Jeffamines®. In some embodiments, the aliphatic amine hardener comprises isophorone diamine.

In certain embodiments, glycidyl ester epoxy includes at least 2 epoxy groups. In some specific embodiments, the glycidyl ester epoxide has the following structure:

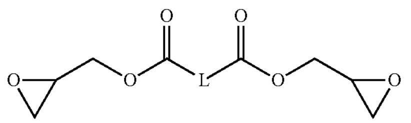

wherein:

L comprises an alkylene, a cycloalkylene, a cycloalkenylene, arylene, or heterocyclylene.

In some more specific embodiments, L has one of the following structures:

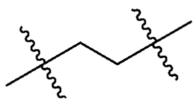
,
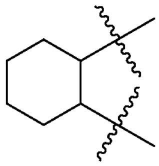
,
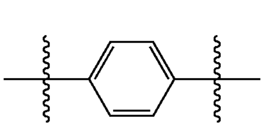
,
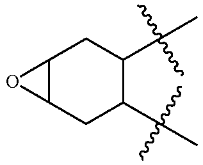
,
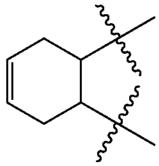
,
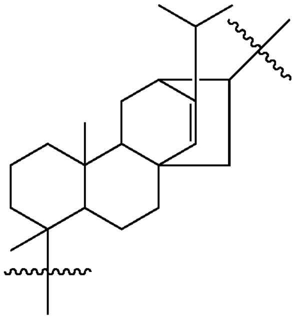
,
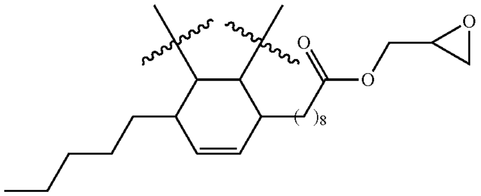
or
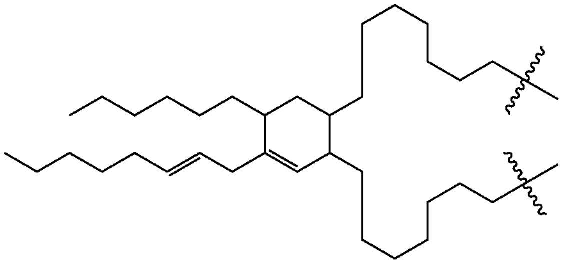
.

In some embodiments, the glycidyl ester epoxy is diglycideyl succinate, diglycidyl 1, 2, cyclohexanedicarboxylate, diglycidyl terephthalate, digycidyl 4,5,-epoxytetrahydrophthalate, diglycidylester of acrylopimaric acid, triglycidylester of fatty acid, diglycidylester of dimer acid, diglycidyl 1,2,3,6-tetrahydrophthalate, or combinations thereof. In some more specific embodiments, the glycidyl ester epoxide is diglycideyl succinate. In some more specific embodiments, the glycidyl ester epoxide is diglycidyl 1, 2, cyclohexanedicarboxylate. In some more specific embodiments, the glycidyl ester epoxide is diglycidyl terephthalate. In more specific embodiments, the glycidyl ester epoxide is digycidyl 4,5,-epoxytetrahydrophthalate. In certain embodiments, the glycidyl ester epoxide is diglycidylester of acrylopimaric acid. In still more embodiments, the glycidyl ester epoxide is triglycidylester of fatty acid. In some embodiments, the glycidyl ester epoxide is diglycidylester of dimer acid. In certain embodiments, the glycidyl ester epoxide is diglycidyl 1,2,3,6-tetrahydrophthalate.

In some embodiments, the glycidyl ester epoxy has one of the following structures:

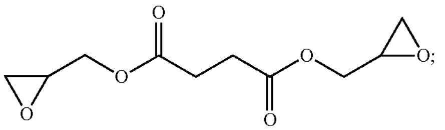

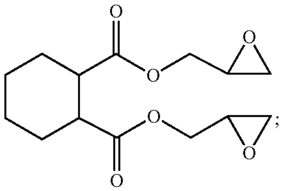

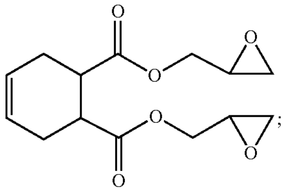

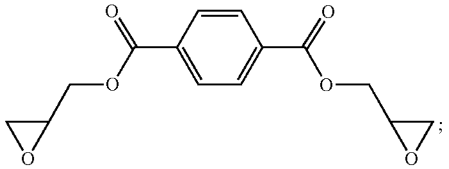

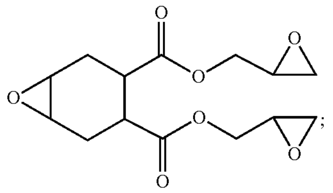

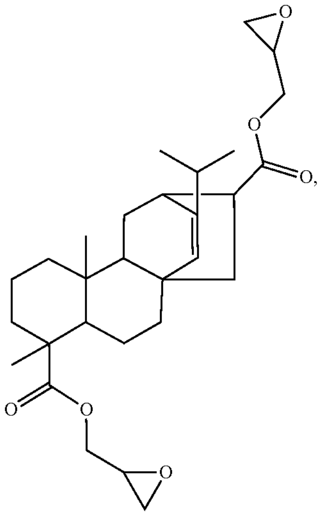

-continued

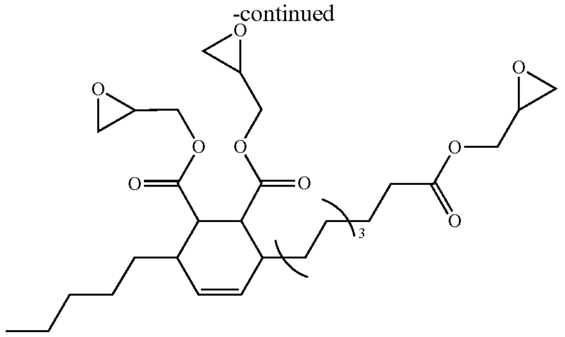

or

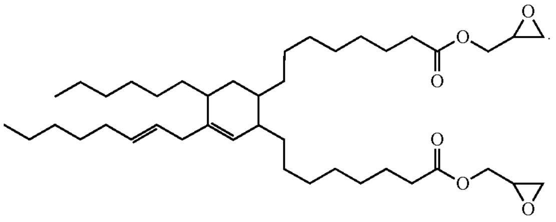 [SMILES: CCCCC/C=C/CC1=CC(CCCCCCCC(=O)OCC2CO2)C(CCCCCCCC(=O)OCC2CO2)CC1CCCCCC]

In some specific embodiments, the glycidyl ester epoxy has the following structure:

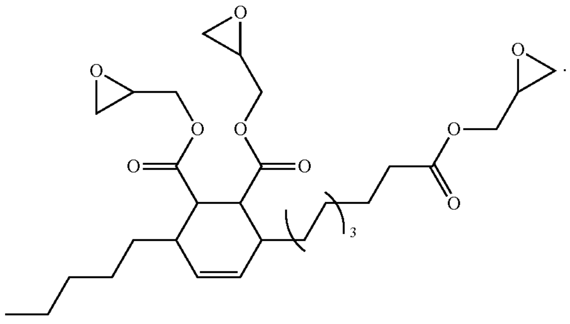

In some embodiments, the glycidyl ester epoxy comprises diglycidyl succinate, diglycidyl 1,2-cyclohexanedicarboxylate, diglycidyl terephthalate, diglycidyl 4,5-epoxyterahydrophthalate, diglycidylester of acrylopimaric acid, triglycidylester of fatty acid, digylcidylester of dimer acid, diglycidyl 1,2,3,6-tetrahydrophthalate, or combinations thereof.

In certain embodiments, the glycidyl ether epoxy content and glycidyl amine epoxy content together constitutes 0 to 50 wt % of the resin composition. In more specific embodiments, the glycidyl ether epoxy content and glycidyl amine epoxy content together constitutes about 0.1 to 50 wt %, 1 to 50 wt %, 5 to 50 wt %, 10 to 50 wt %, 20 to 50 wt %, 30 to 50 wt %, 40 to 50 wt %, 30 to 40 wt %, 20 to 30 wt %, 10 to 20 wt %, 5 to 10 wt %, 1 to 5 wt %, 0.1 to 1 wt %, or 5 to 30 wt %, of the resin composition.

In some embodiments, the resin composition further comprises catalyst at a concentration ranging from about 0 to 5 wt % of the resin composition. In some embodiments, the resin composition comprises catalyst at a concentration ranging from about 0.1 to 5 wt %, about 0.1 to 4 wt %, about 0.1 to 3 wt %, about 0.1 to 2 wt %, about 0.1 to 1 wt %, about 1 to 5 wt %, about 2 to 5 wt %, about 3 to 5 wt %, about 4 to 5 wt %, about 3 to 4 wt %, about 2 to 3 wt %, about 1 to 2 wt %, about 0.5 to 5 wt %, about 0.5 to 4 wt %, about 0.5 to 3 wt %, or about 0.5 to 3.5 wt % of the resin composition.

In some embodiments, the catalyst is zinc acetate, zinc acetylacetonate, triethanolamine, diazabicycloundecene, triazabicyclodecene, or 4-dimethylaminopyridine. In some embodiments, the catalyst comprises zinc acetate, zinc acetylacetonate, triethanolamine, diazabicycloundecene, triazabicyclodecene, 4-dimethylaminopyridine, or combinations thereof. In some embodiments, the resin composition further comprises a catalyst selected from the group consisting of zinc acetate, zinc acetylacetonate, triethanolamine, diazabicycloundecene, triazabicyclodecene, 4-dimethylaminopyridine, and combinations thereof.

In certain embodiments, the resin composition has a molar ratio between epoxy groups and active hydrogen groups ranging from 1/0.5 to 1/1.5. In certain embodiments, the molar ratio between epoxy groups and active hydrogen groups ranges from 1/0.25 to 1/1.75, from 1/0.3 to 1/1.6, or from 1/0.45 to 1/1.65.

Polymer Composition

Another aspect of the present disclosure provides a polymer composition as the product of the resin compositions described herein. In one embodiment, the polymer composition is an ambient temperature curable epoxy vitrimer.

Accordingly, one embodiment provides a vitrimer resin comprising a dynamic network of functional groups. A more specific embodiment provides a polymer composition comprising a dynamic network of functional groups comprising at least one ester, at least one —OH, and at least one tertiary amine.

One embodiment provides a polymer composition comprising a glycidyl ester substructure:

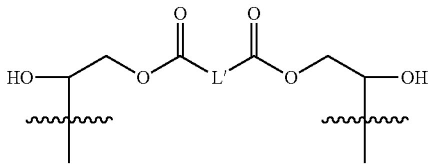

wherein:

L' comprises an alkylene, a cycloalkylene, a cycloalkenlene, arylene, or heterocyclylene; and at least one tertiary amine having the following substructure:

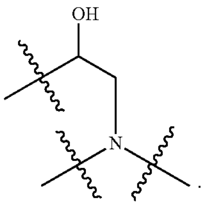 [SMILES: *C(O)CN(*)*]

In some embodiments, the tertiary amine substructure has the following substructure:

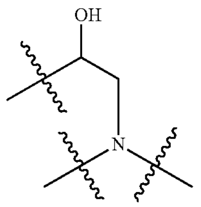

In more specific embodiments, the polymer composition comprises the following glycidyl ester substructure:

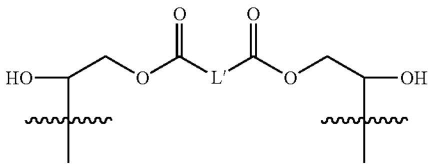

wherein:

L' comprises an alkylene, a cycloalkylene, a cycloalkenylene, arylene, or heterocyclylene.

In more specific embodiments, the polymer composition comprises the following glycidyl ester substructure:

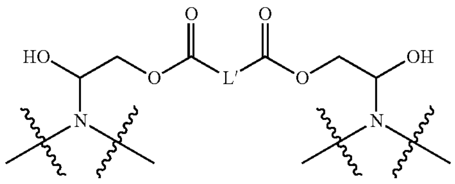

wherein:

L' comprises an alkylene, a cycloalkylene, a cycloalkenylene, arylene, or heterocyclylene.

In some more specific embodiments, L' has one of the following structures:

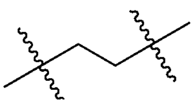 , 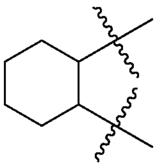 ,

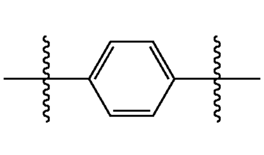 , 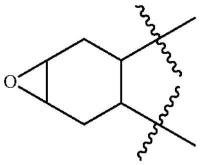 ,

-continued
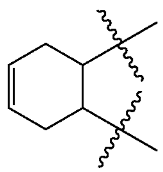
,
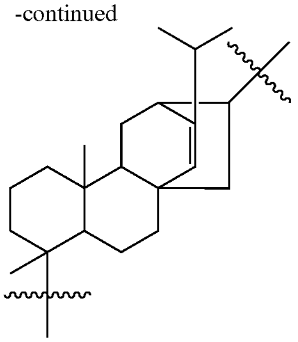
,
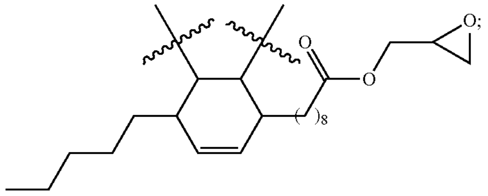
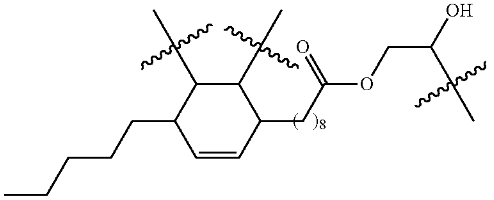
or
-continued
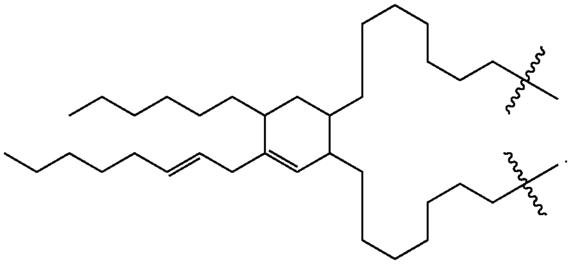
In some embodiments, L' has the following structure:
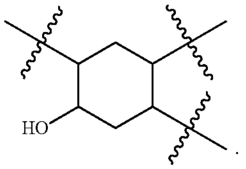 [SMILES: *C1CC(*)C(O)CC1*]
In some embodiments, the polymer composition comprises one of the following substructures:
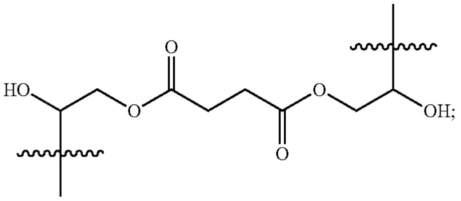
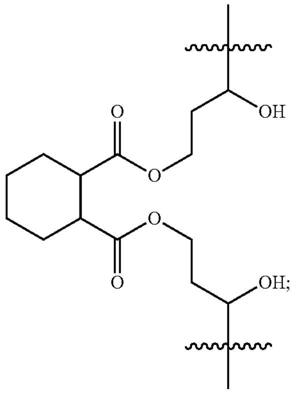
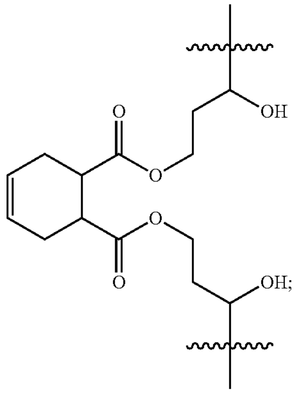
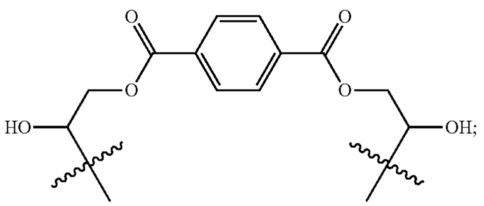

-continued
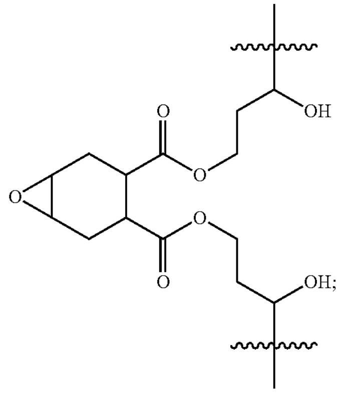
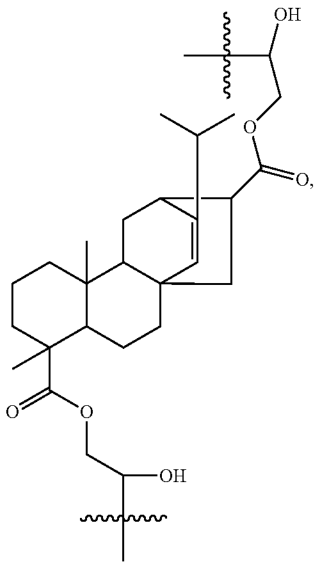
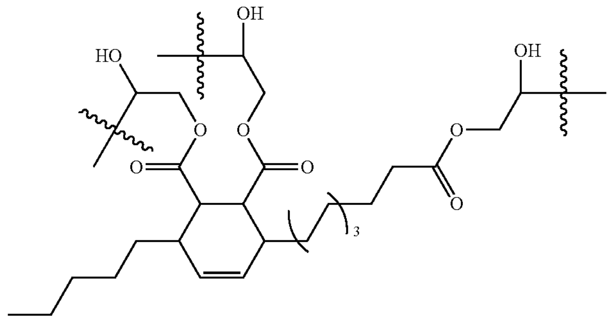
or
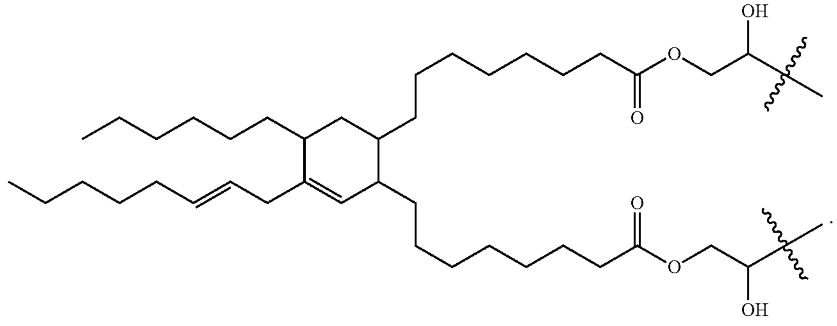

In some embodiments, the polymer composition comprises the following substructure:
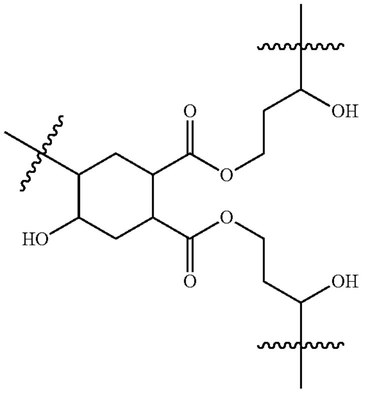 [SMILES: *C(O)CCOC(=O)C1CC(*)C(O)CC1C(=O)OCCC(*)O]
In some embodiments, the polymer composition comprises one of the following substructures:
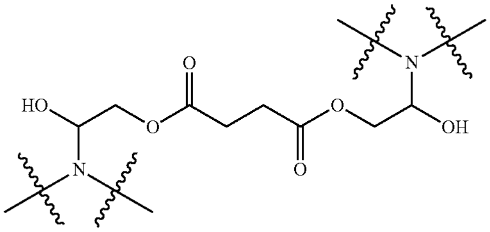
;
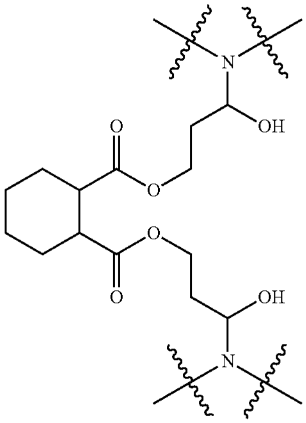
;
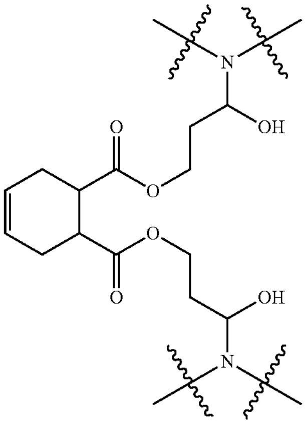
;
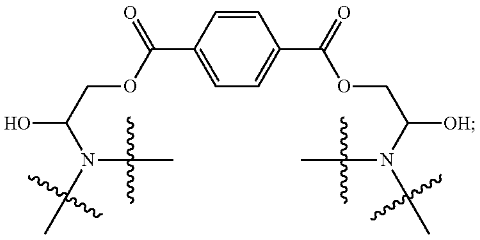
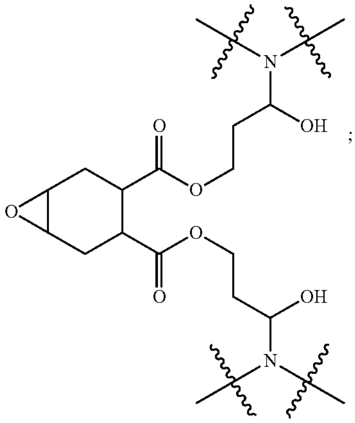
;
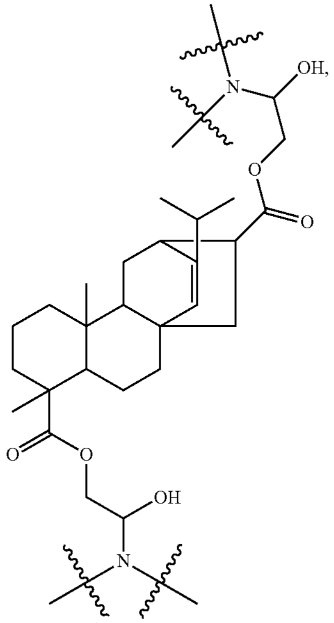

-continued
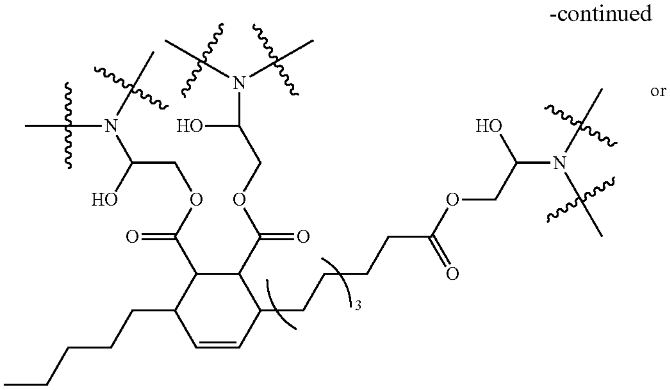
or
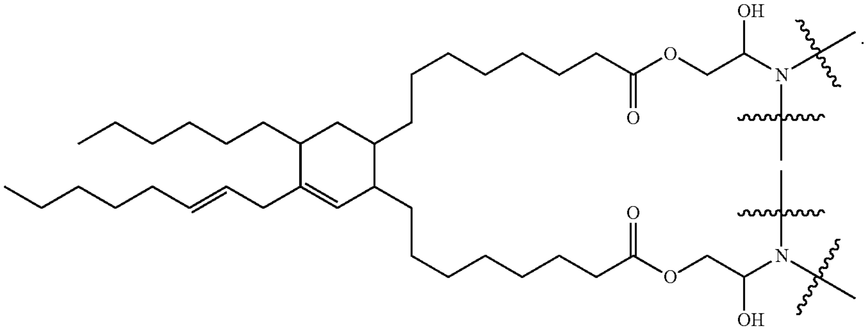 [SMILES: *N(*)C(O)COC(=O)CCCCCCCC1C=C(C/C=C/CCCCC)C(CCCCCC)CC1CCCCCCCC(=O)OCC(O)N(*)*]
In some embodiments, the polymer composition comprises one of the following substructure:
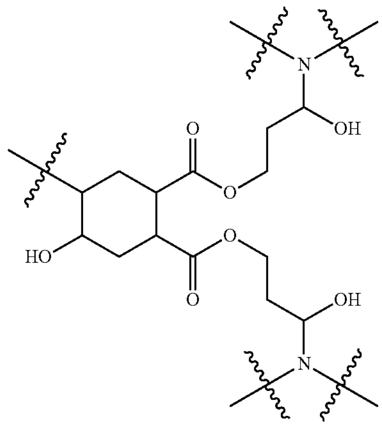 [SMILES: *C1CC(C(=O)OCCC(O)N(*)*)C(C(=O)OCCC(O)N(*)*)CC1O]
In some specific embodiments, the glycidyl ester substructure is:
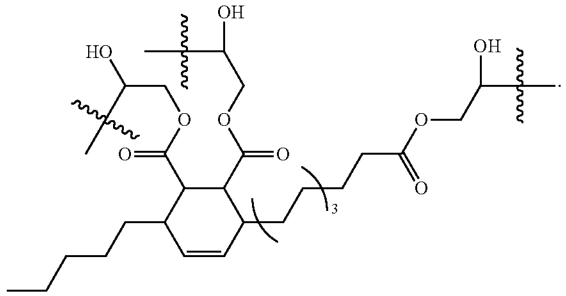
In some specific embodiments, the glycidyl ester substructure is:
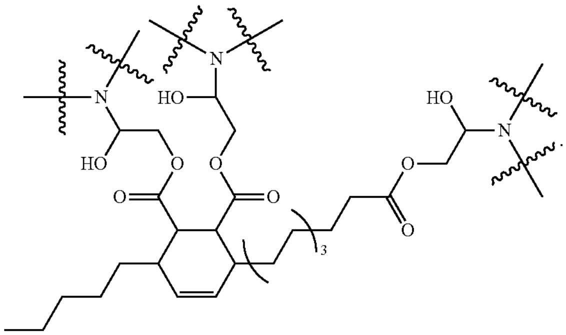

In some embodiments, the polymer composition comprises one of the following substructures:
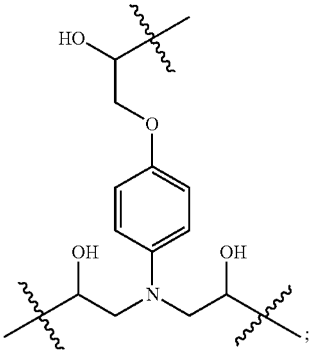
;
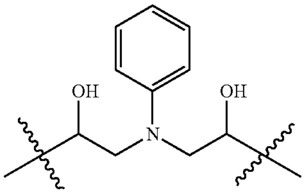
or
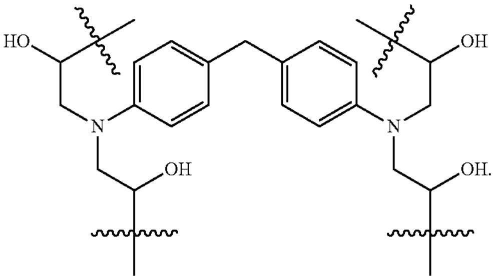
In some embodiments, the polymer composition comprises one of the following substructures:
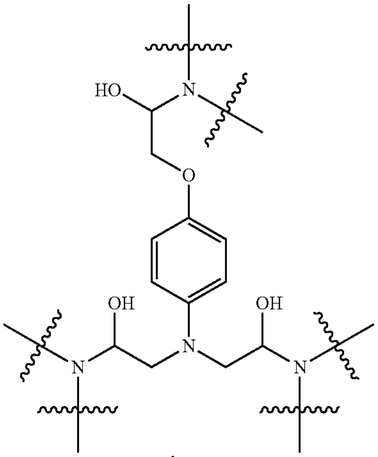
;
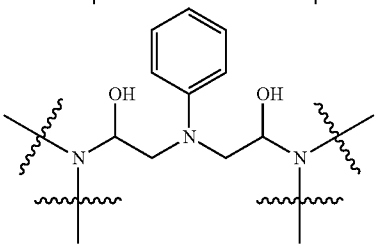
or
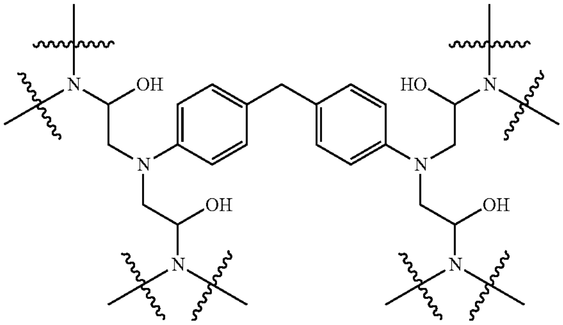
.
In some embodiments, the polymer composition comprises one of the following substructures:
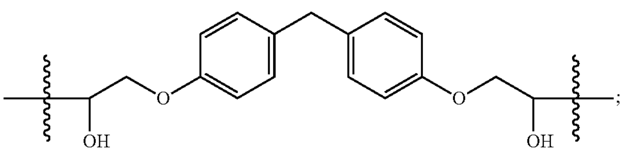
;
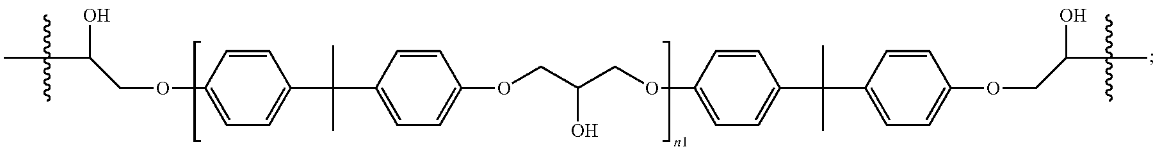
;

-continued
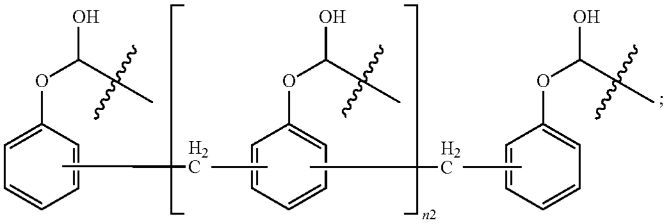
;
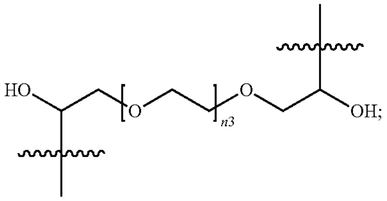
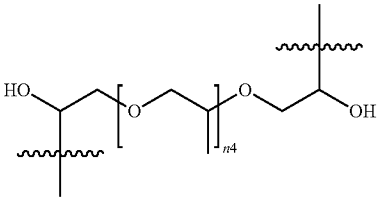
or
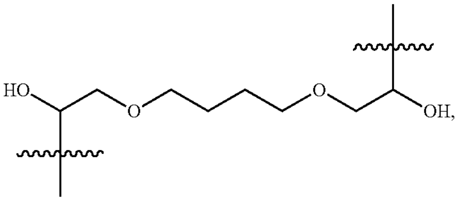
wherein:
n1 is an integer from 0-10;
n2 is an integer from 0-20;
n3 is an integer from 1-10; and
n4 is an integer from 1-10.
In some embodiments, the polymer composition comprises one of the following substructures:
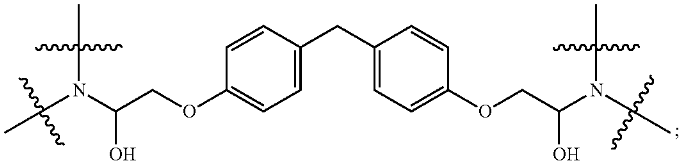
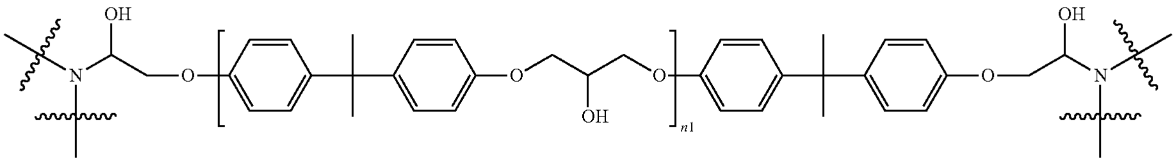
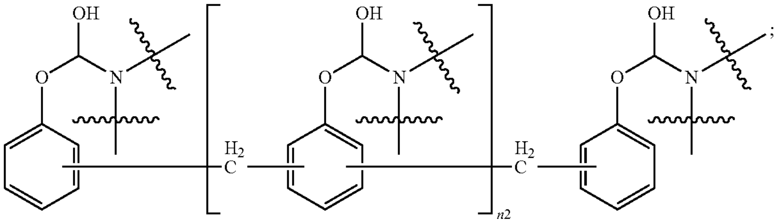
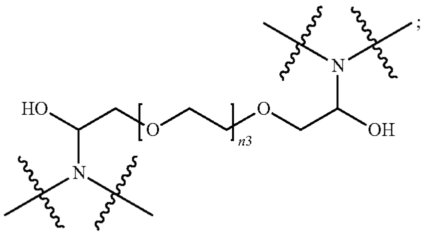
or
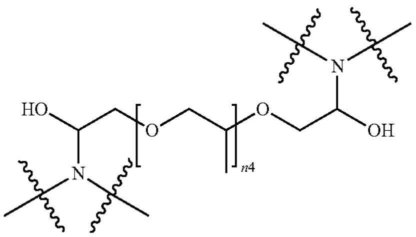

-continued

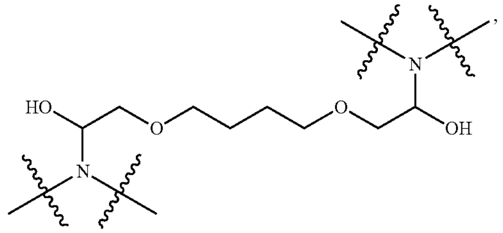

wherein:

n1 is an integer from 0-10;

n2 is an integer from 0-20;

n3 is an integer from 1-10; and n4 is an integer from 1-10.

In another embodiment, the polymer composition is prepared from a resin composition having a molar ratio between epoxy groups and active hydrogen groups ranging from 1/0.5 to 1/1.5. In certain embodiments, the molar ratio between epoxy groups and active hydrogen groups ranges from 1/0.25 to 1/1.75, from 1/0.3 to 1/1.6, or from 1/0.45 to 1/1.65.

In some more specific embodiments, the polymer composition comprises substructure components that result from the component parts of the resin mixture (e.g., glycidyl ester epoxy, aliphatic amine hardener, glycidyl ether epoxy, glycidylamine epoxy, etc.). That is, in certain embodiments, the polymer composition consists essentially of a glycidyl ester epoxy, an aliphatic amine hardener, a glycidyl ether epoxy, and/or a glycidylamine epoxy substructure. In some more specific embodiments, the polymer composition consists of a glycidyl ester epoxy, an aliphatic amine hardener, a glycidyl ether epoxy, and/or a glycidylamine epoxy substructure.

Methods of Preparation

Embodiments of the present disclosure also cover methods of preparing a resin composition and a polymer (vitrimer) composition.

Accordingly, one embodiment provides a method of preparing a repairable and ambient curable vitrimer resin comprising mixing a glycidyl ester epoxide and an aliphatic amine hardener thereby forming a resin composition.

In some embodiments, additional components are present in the resin composition during the mixing. In certain more specific embodiments, the resin composition further comprises a glycidyl ether epoxy, a glycidyl amine epoxy, a catalyst, or combinations thereof. In some embodiments, the resin composition further comprises a glycidyl ether epoxy. In some other embodiments, the resin composition further comprises a glycidyl amine epoxy. In some other embodiments, the resin composition further comprises a catalyst. In some embodiments, the resin composition further comprises a glycidyl ether epoxy and a glycidyl amine epoxy. In some embodiments, the resin composition further comprises a glycidyl ether epoxy and a catalyst. In some embodiments, the resin composition further comprises a glycidyl amine epoxy and a catalyst. In some embodiments, the resin composition further comprises a glycidyl ether epoxy, a glycidyl amine epoxy, and a catalyst.

In certain embodiments, the glycidyl ether epoxy comprises bisphenol A diglycidyl ether, bisphenol F diglycidyl ether, epoxy cresol novolak, poly(ethylene glycol) diglycidyl ether, poly(propylene glycol) diglycidyl ether, 1,4-butanediol diglycidyl ether, and combinations thereof.

In some embodiments, the glycidyl amine epoxy comprises N,N-diglycidylaniline, N,N-diglycidyl-4-glycidyloxyaniline, 4,4'-methylenebis(N,N-diglycidylaniline), and combinations thereof.

In some embodiments, the glycidyl ester epoxy has at least 2 epoxy groups. In some more specific embodiments, the glycidyl ester epoxy has 2 epoxy groups. In more specific embodiments, the glycidyl ester epoxy has 3 epoxy groups.

In certain embodiments, the glycidyl amine epoxy has at least 2 epoxy groups. In more specific embodiments, the glycidyl amine epoxy has 2 epoxy groups. In certain more specific embodiments, the glycidyl amine epoxy has 3 epoxy groups.

In another embodiment, the resin composition further comprises a glycidyl ether epoxy that has at least 2 epoxy groups. In more specific embodiments, the glycidyl ether epoxy has 2 epoxy groups. In certain more specific embodiments, the glycidyl ether epoxy has 3 epoxy groups.

In another embodiment, the aliphatic amine hardener that has at least 3 active hydrogens. In a more specific embodiment, the aliphatic amine hardener comprises at least one moiety selected from the group consisting of —OH, $—NH_2$, —NH—, $—NH—NH_2$, —SH, and combinations thereof. In some embodiments, the aliphatic amine hardener comprises at least one —OH moiety. In some embodiments, the aliphatic amine hardener comprises at least one $—NH_2$ group.

In some embodiments, the aliphatic amine hardener has the following structure:

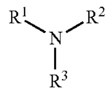

wherein:

$R^1$, $R^2$, and $R^3$ are each independently hydrogen, $—(CH_2)_nNH_2$, or $—(CH_2)_n—NH—(CH_2)_m—NH_2$, provided that one of $R^1$, $R^2$ and $R^3$ is not hydrogen n is 1, 2, or 3; and m is 1, 2, or 3.

In some more specific embodiments, the aliphatic amine hardener is triethylenetetramine, ethylenediamine, diethylenetriamine, tris-(2-aminoethyl)amine, or combinations thereof. In some more specific embodiments, aliphatic amine hardener is triethylenetetramine. In more specific embodiments, the aliphatic amine hardener is ethylenediamine. In more specific embodiments, the aliphatic amine hardener is diethylenetriamine. In more specific embodiments, the aliphatic amine is tris-(2-aminoethyl)amine.

In some embodiments, the aliphatic amine hardener comprises triethylenetetramine, ethylenediamine, diethylenetriamine, tris(2-aminoethyl)amine, aliphatic, Jeffamine, or combinations thereof. In some embodiments, the aliphatic amine hardener comprises triethylenetetramine, ethylenediamine, diethylenetriamine, tris(2-aminoethyl)amine, aliphatic, isophorone diamine, Jeffamine®, or combinations thereof. In some embodiments, the aliphatic amine hardener comprises various Jeffamines®.

In certain embodiments, glycidyl ester epoxy includes at least 2 epoxy groups. In some specific embodiments, the glycidyl ester epoxide has the following structure:

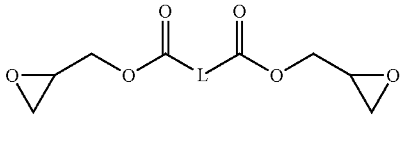

wherein:

L comprises an alkylene, a cycloalkylene, a cycloalkenylene, arylene, or heterocyclylene.

In some more specific embodiments, L has one of the following structures:

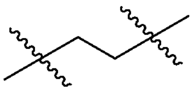 , 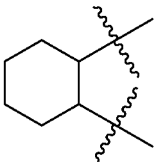 ,

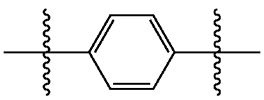 , 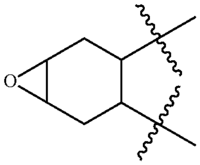 ,

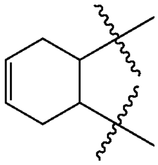 , 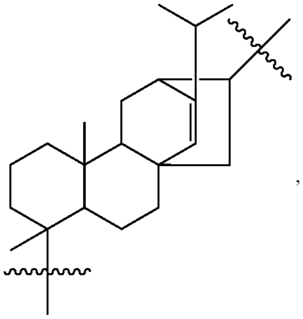 ,

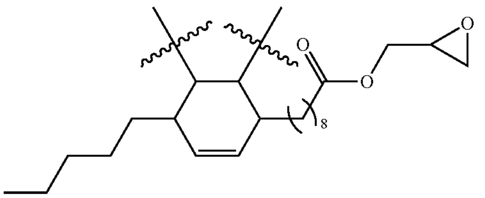 or

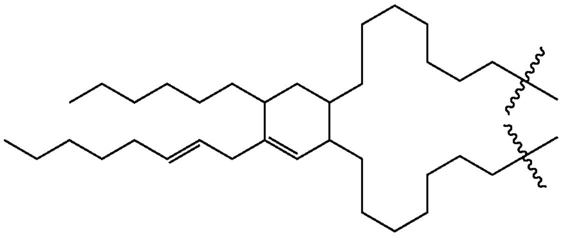 .

In some embodiments, the glycidyl ester epoxy is diglycideyl succinate, diglycidyl 1, 2, cyclohexanedicarboxylate, diglycidyl terephthalate, digycidyl 4,5,-epoxytetrahydrophthalate, diglycidylester of acrylopimaric acid, triglycidylester of fatty acid, diglycidylester of dimer acid, diglycidyl 1,2,3,6-tetrahydrophthalate, or combinations thereof. In some more specific embodiments, the glycidyl ester epoxide is diglycideyl succinate. In some more specific embodiments, the glycidyl ester epoxide is diglycidyl 1, 2, cyclohexanedicarboxylate. In some more specific embodiments, the glycidyl ester epoxide is diglycidyl terephthalate. In more specific embodiments, the glycidyl ester epoxide is digycidyl 4,5,-epoxytetrahydrophthalate. In certain embodiments, the glycidyl ester epoxide is diglycidylester of acrylopimaric acid. In still more embodiments, the glycidyl ester epoxide is triglycidylester of fatty acid. In some embodiments, the glycidyl ester epoxide is diglycidylester of dimer acid. In certain embodiments, the glycidyl ester epoxide is diglycidyl 1,2,3,6-tetrahydrophthalate.

In some embodiments, the glycidyl ester epoxy has one of the following structures:

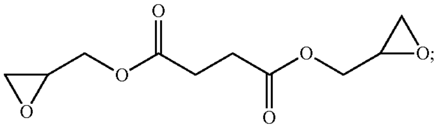

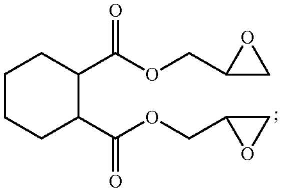 ; 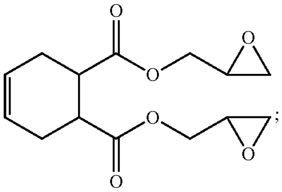 ;

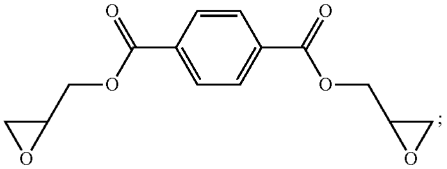 ;

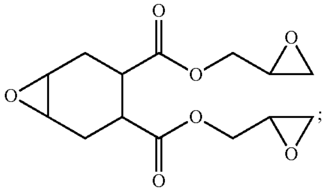 ;

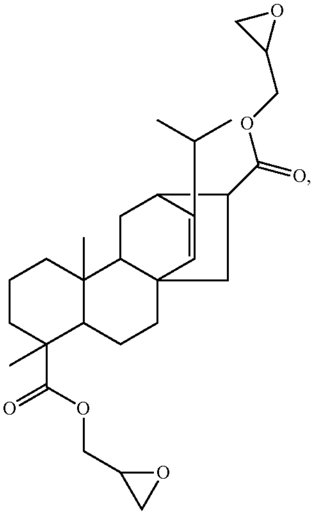 ,

-continued

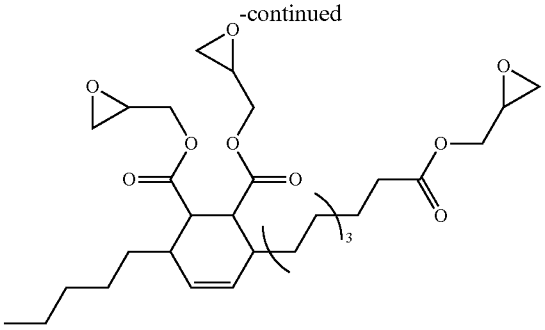

or

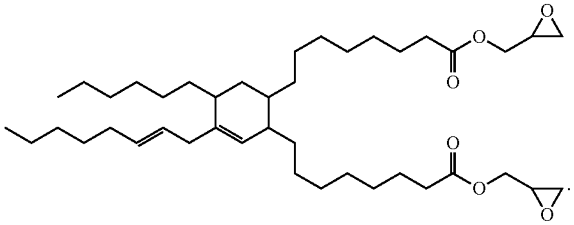

In some specific embodiments, the glycidyl ester epoxy has the following structure:

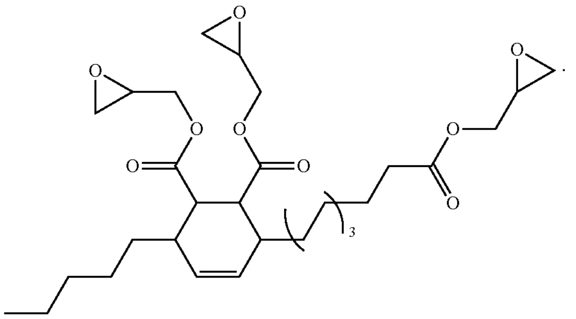

In some embodiments, the glycidyl ester epoxy comprises diglycidyl succinate, diglycidyl 1,2-cyclohexanedicarboxylate, diglycidyl terephthalate, diglycidyl 4,5-epoxyterahydrophthalate, diglycidylester of acrylopimaric acid, triglycidylester of fatty acid, digylcidylester of dimer acid, diglycidyl 1,2,3,6-tetrahydrophthalate, or combinations thereof.

In some embodiments, the composition further comprises one of the following compounds:

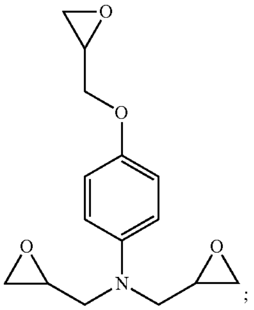

;

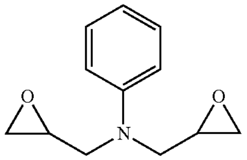

or

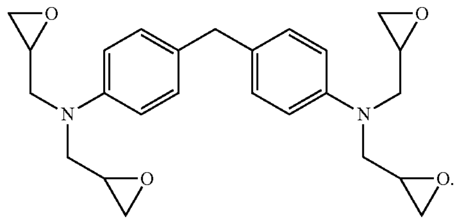

In some embodiments, the composition further comprises one of the following compounds:

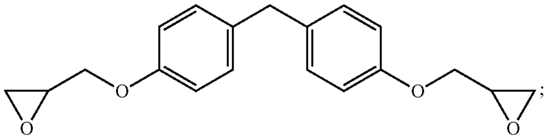

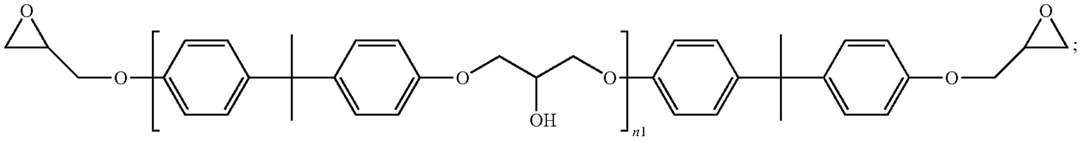

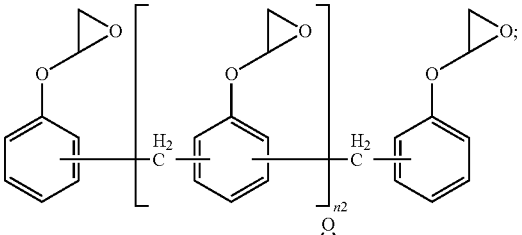

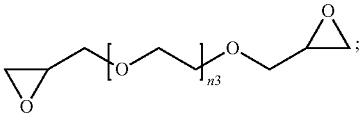

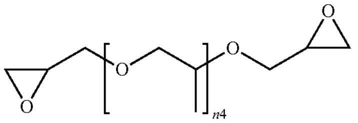

or

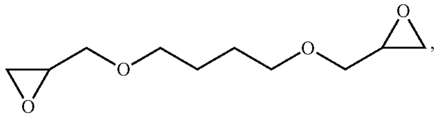

wherein:

n1 is an integer from 0-10;

n2 is an integer from 0-20;

n3 is an integer from 1-10; and n4 is an integer from 1-10.

In certain embodiments, the glycidyl ether epoxy content and glycidyl amine epoxy content together constitutes 0 to 50 wt % of the total resin composition. In more specific embodiments, the glycidyl ether epoxy content and glycidyl amine epoxy content together constitutes about 0.1 to 50 wt %, 1 to 50 wt %, 5 to 50 wt %, 10 to 50 wt %, 20 to 50 wt %, 30 to 50 wt %, 40 to 50 wt %, 30 to 40 wt %, 20 to 30 wt %, 10 to 20 wt %, 5 to 10 wt %, 1 to 5 wt %, 0.1 to 1 wt %, or 5 to 30 wt %, of the resin composition.

In some embodiments, the resin composition further comprises catalyst at a concentration ranging from about 0 to 5 wt % of the resin composition. In some embodiments, the resin composition comprises catalyst at a concentration ranging from about 0.1 to 5 wt %, about 0.1 to 4 wt %, about 0.1 to 3 wt %, about 0.1 to 2 wt %, about 0.1 to 1 wt %, about 1 to 5 wt %, about 2 to 5 wt %, about 3 to 5 wt %, about 4 to 5 wt %, about 3 to 4 wt %, about 2 to 3 wt %, about 1 to 2 wt %, about 0.5 to 5 wt %, about 0.5 to 4 wt %, about 0.5 to 3 wt %, or about 0.5 to 3.5 wt % of the resin composition.

In some embodiments, the catalyst is zinc acetate, zinc acetylacetonate, triethanolamine, diazabicycloundecene, triazabicyclodecene, or 4-dimethylaminopyridine. In some embodiments, the catalyst comprises zinc acetate, zinc acetylacetonate, triethanolamine, diazabicycloundecene, triazabicyclodecene, 4-dimethylaminopyridine, or combinations thereof.

In certain embodiments, the resin composition has a molar ratio between epoxy groups and active hydrogen groups ranging from 1/0.5 to 1/1.5. In certain embodiments, the molar ratio between epoxy groups and active hydrogen groups ranges from 1/0.25 to 1/1.75, from 1/0.3 to 1/1.6, or from 1/0.45 to 1/1.65.

An advantageous aspect of the resin compositions of the present disclosure is that they can be cure at (or around) ambient temperature.

Accordingly, one embodiment provides a method of preparing a polymer composition, the method comprising mixing a glycidyl ester epoxide and an aliphatic amine hardener and forming a resin composition and initiating a polymerization reaction thereby forming a polymer composition comprising a dynamic network of functional groups comprising at least one ester, at least one —OH, and at least one tertiary amine.

One embodiment provides a method for preparing a polymer composition, the method comprising mixing a glycidyl ester epoxide having the following structure:

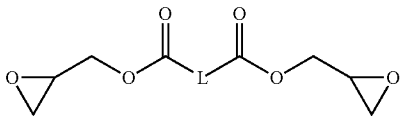

wherein:

L comprises an alkylene, a cycloalkylene, a cycloalkenlene, arylene, or heterocyclylene; and an aliphatic amine hardener having the following structure:

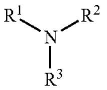

wherein:

$R^1$, $R^2$, and $R^3$ are each independently hydrogen, $-(CH_2)_nNH_2$, or $-(CH_2)_n-NH-(CH_2)_m-NH_2$, provided that one of $R^1$, $R^2$ and $R^3$ is not hydrogen n is 1, 2, or 3; and m is 1, 2, or 3;

thereby forming a resin composition; and initiating a polymerization reaction thereby forming a polymer composition.

In more specific embodiments, the polymer composition comprises the following substructure:

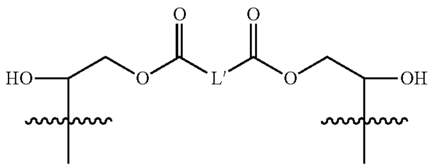

wherein:

L' comprises an alkylene, a cycloalkylene, a cycloalkenylene, arylene, or heterocyclylene.

In more specific embodiments, the polymer composition comprises the following glycidyl ester substructure:

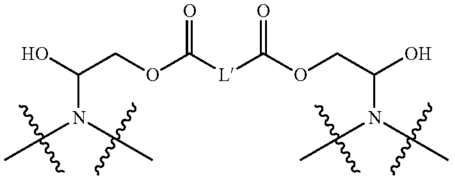

wherein:

L' comprises an alkylene, a cycloalkylene, a cycloalkenylene, arylene, or heterocyclylene.

In some more specific embodiments, L' has one of the following structures:

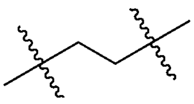, 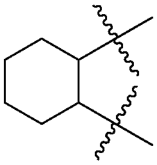,

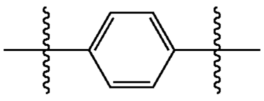, 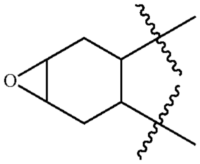,

-continued
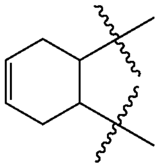
,
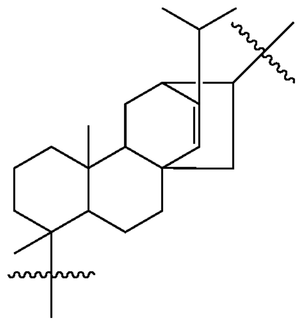
,
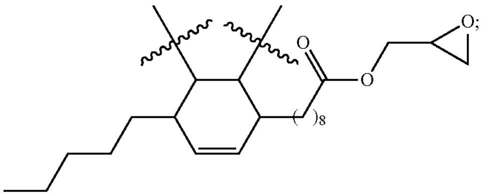
;
-continued
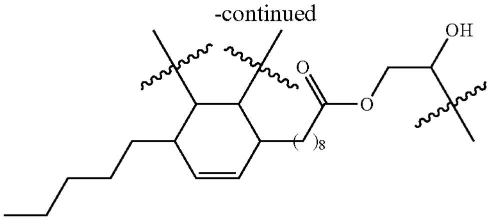
or
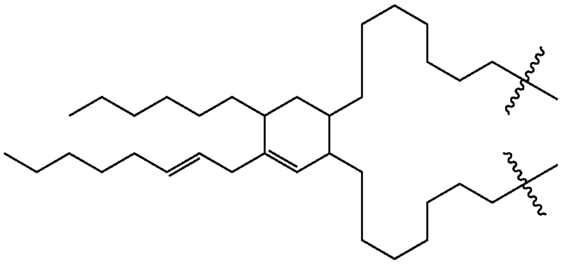
.
In some embodiments, the polymer composition comprises one of the following substructures:
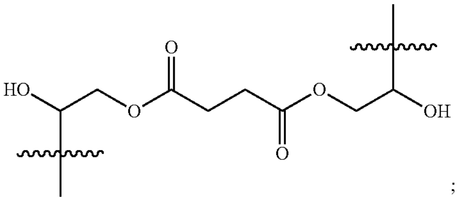
;
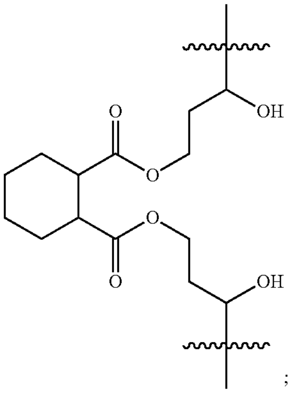
;
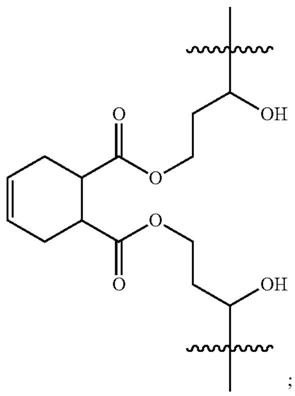
;
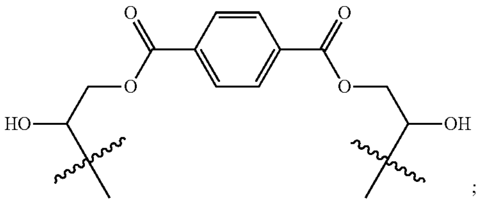
;

-continued
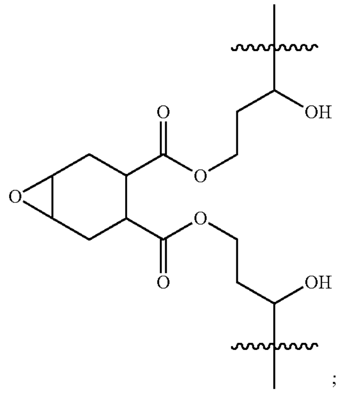
;
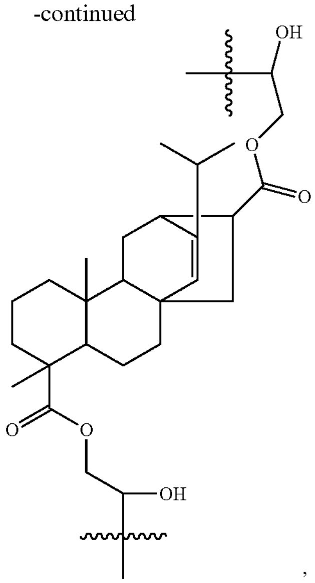
,
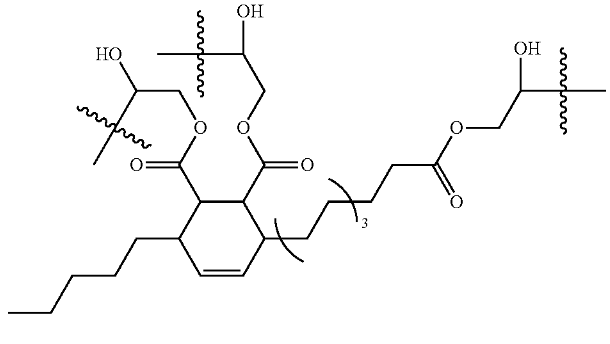
or
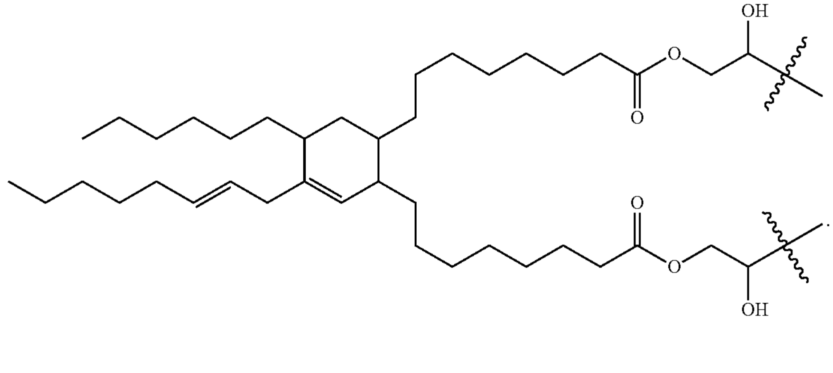
.

In some embodiments, the polymer composition comprises one of the following substructures:
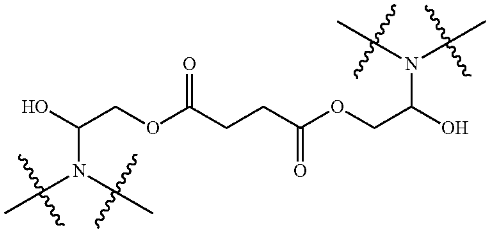
;
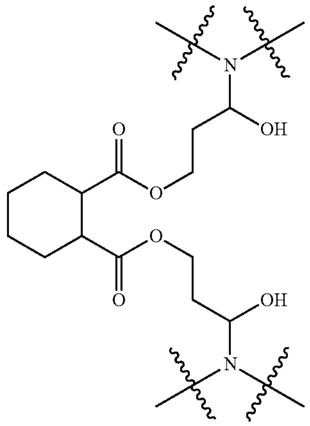
;
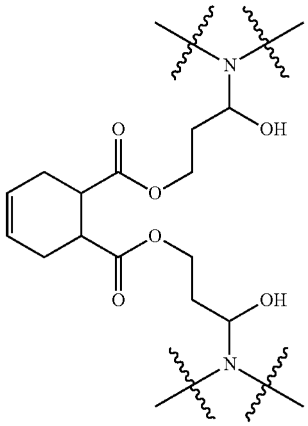
;
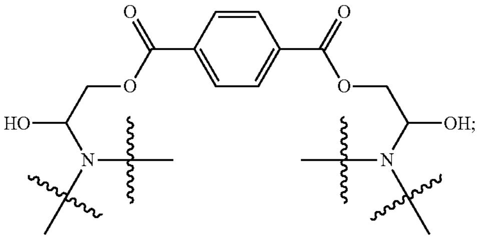
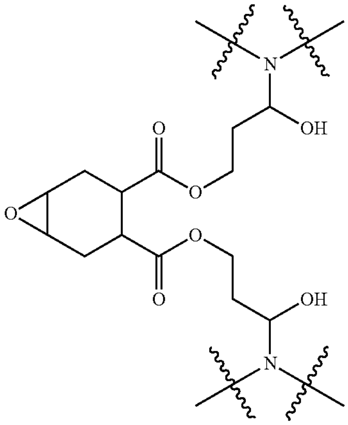
;
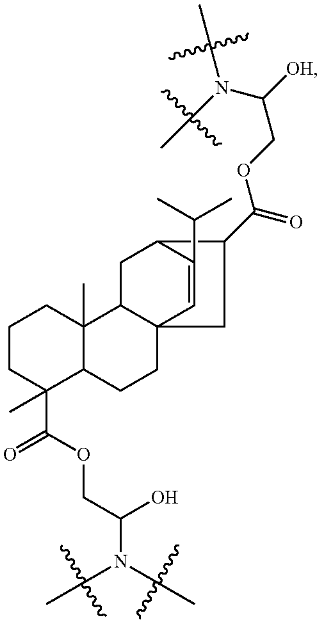
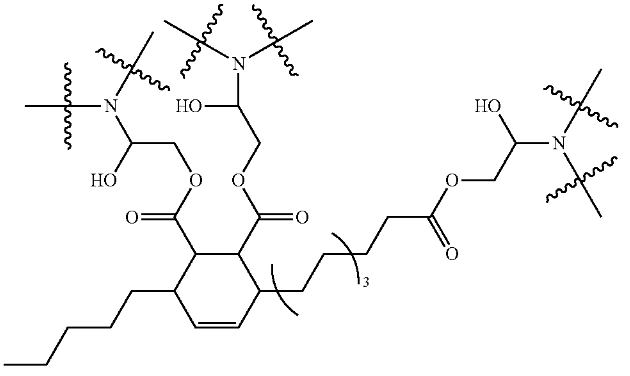
or -continued
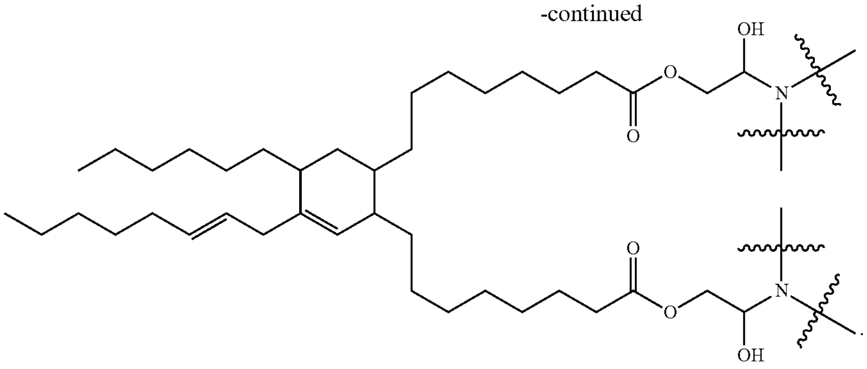
In some specific embodiments, the polymer composition comprises the following substructure:
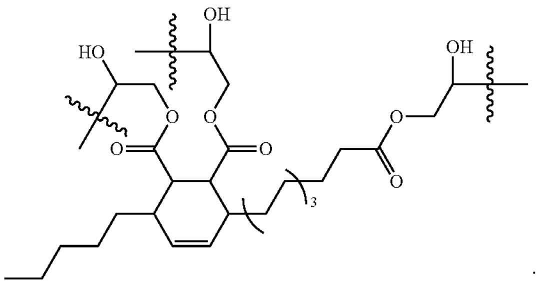
In some specific embodiments, the polymer composition comprises the following substructure:
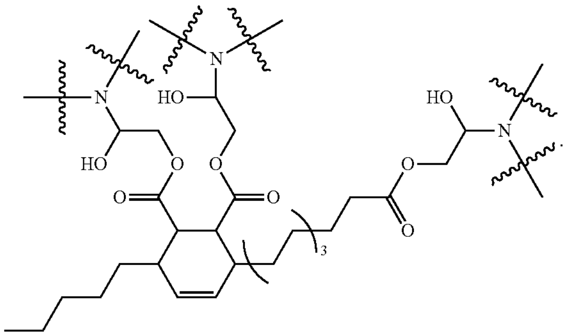
In some embodiments, the method further comprises adding compounds having one of the following structures
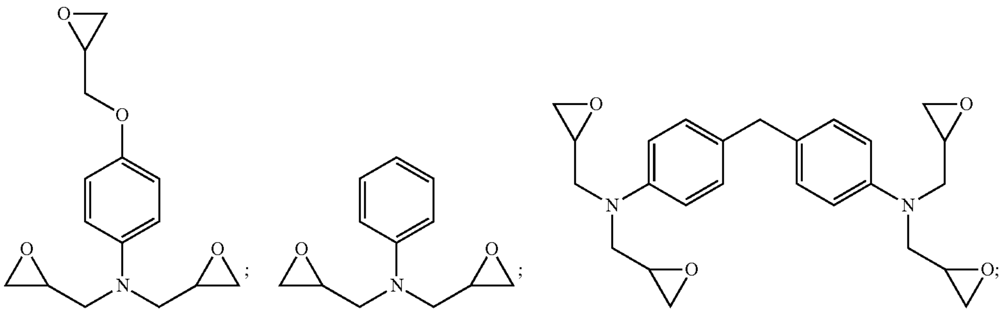
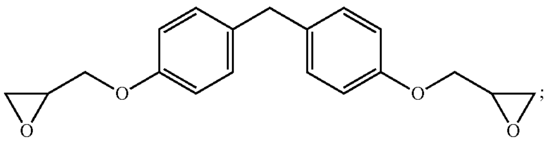
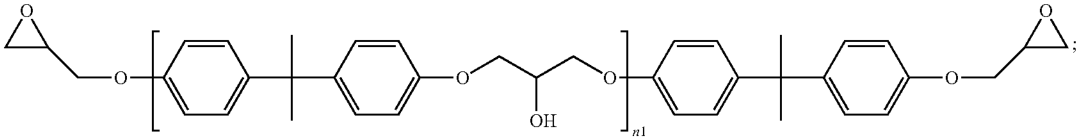
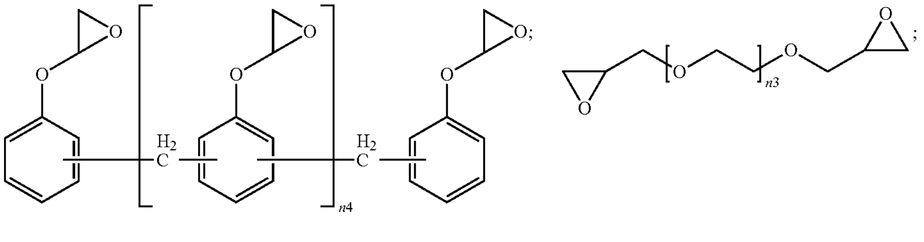

-continued

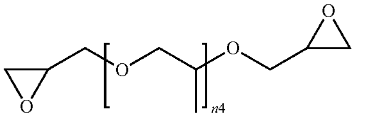

or

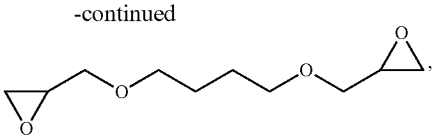

wherein:

n1 is an integer from 0-10;

n2 is an integer from 0-20;

n3 is an integer from 1-10; and n4 is an integer from 1-10, prior to initiating the polymerization.

In some embodiments, the polymer composition comprises one of the following substructures:

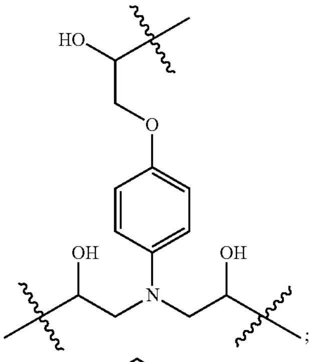

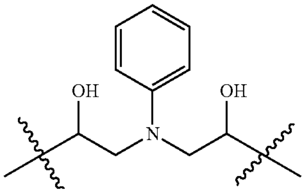

or

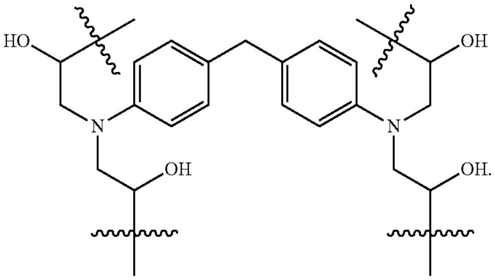

In some embodiments, the polymer composition comprises one of the following substructures:

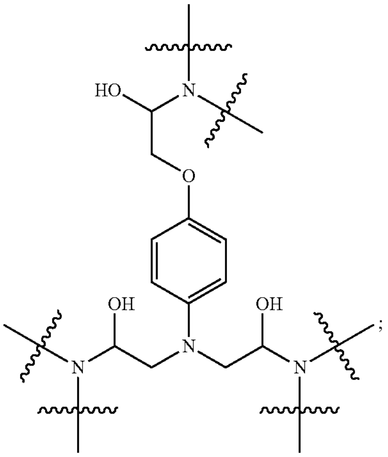

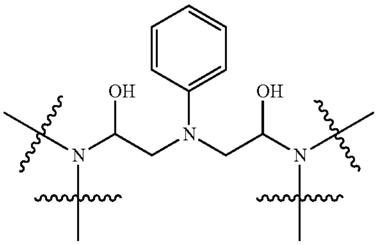

or

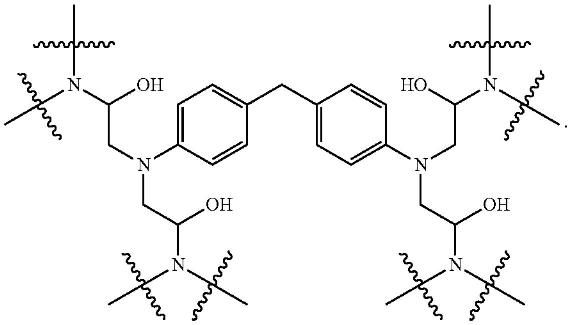

In some embodiments, the polymer composition comprises one of the following substructures:

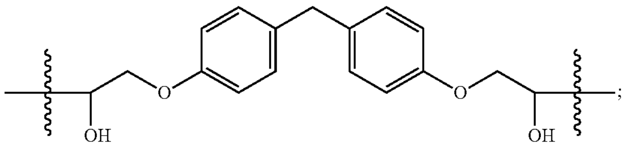

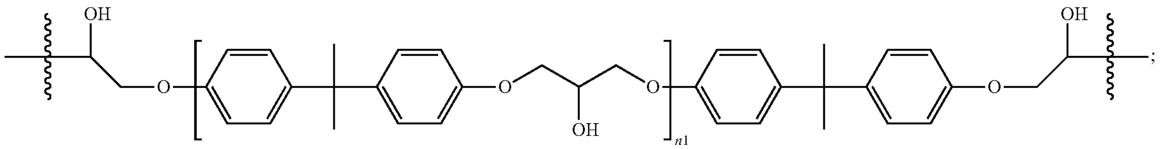

-continued
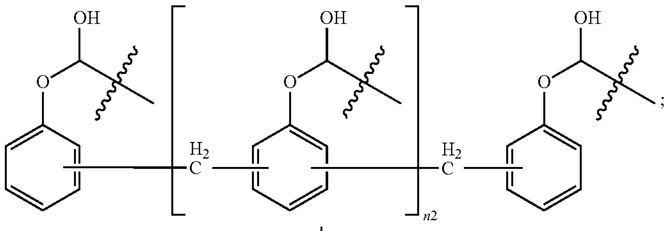
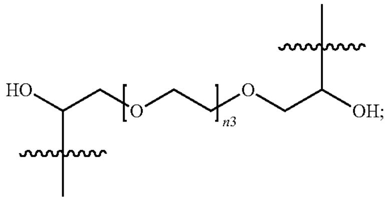
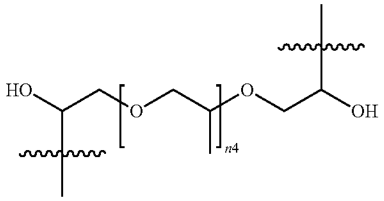
or
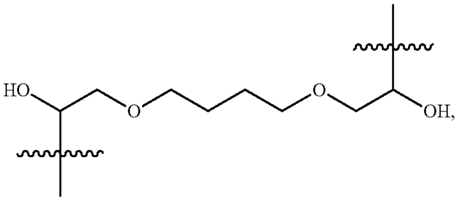
wherein:
n1 is an integer from 0-10;
n2 is an integer from 0-20;
n3 is an integer from 1-10; and
n4 is an integer from 1-10.
In some embodiments, the polymer composition comprises one of the following substructures:
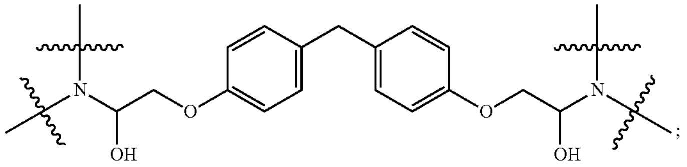
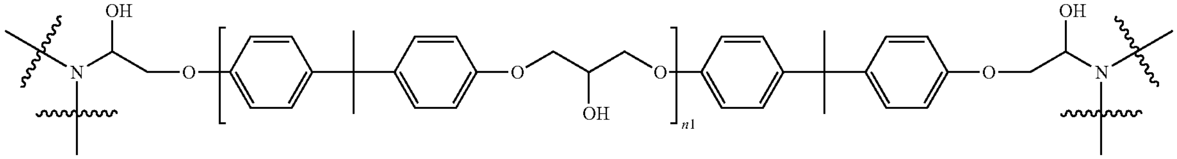
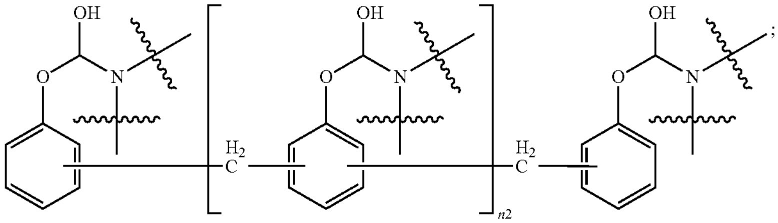
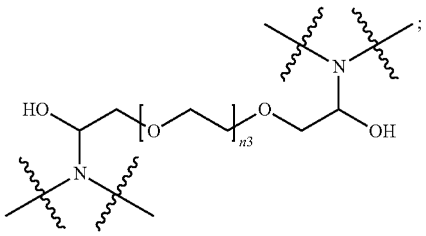
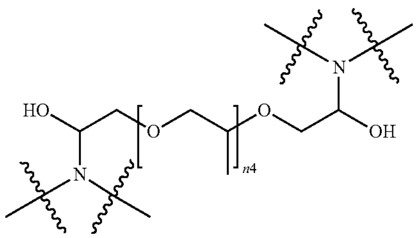
or -continued

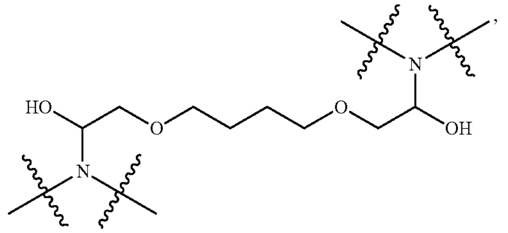

wherein:

n1 is an integer from 0-10;

n2 is an integer from 0-20;

n3 is an integer from 1-10; and n4 is an integer from 1-10.

In another embodiment, the polymer composition is prepared from a resin composition having a molar ratio between epoxy groups and active hydrogen groups ranging from 1/0.5 to 1/1.5. In certain embodiments, the molar ratio between epoxy groups and active hydrogen groups ranges from 1/0.25 to 1/1.75, from 1/0.3 to 1/1.6, or from 1/0.45 to 1/1.65.

In one embodiment, the resin composition is heated at temperature ranging from 10-50° C. during mixing. In one embodiment, the glyciyl ester epoxide and aliphatic amine hardener are heated at temperature ranging from 10-50° C. after mixing. In one embodiment, the heating at a temperature ranging from 10-50° C. cures the polymer. In one embodiment, the polymer composition is an ambient temperature curable epoxy vitrimer.

In some embodiments, the initiating comprises heating the resin composition at a temperature ranging from 10-50° C. during mixing. In more specific embodiments, the resin composition is heated at a temperature ranging from about 15-45° C., from about 20-40° C., from about 20-35° C., from about 20-30° C., from about 20-25° C., from about 21-40° C., from about 22-40° C., from about 23-40° C., from about 22-30° C., from about 22-25° C., from about 15-25° C., from about 15-23° C., or from about 20-23° C.

In more specific embodiments, the resin composition further comprises a catalyst comprising zinc acetate, zinc acetylacetonate, triethanolamine, diazabicycloundecene, triazabicyclodecene, 4-dimethylaminopyridine, or combinations thereof.

An aspect of the embodiments herein is a method for preparing an ambient temperature curable epoxy vitrimer that includes heating an epoxy vitrimer resin at a temperature range of 10-50° C.

In more embodiments, the polymer composition is heated to a temperature ranging from 120-200° C., thereby repairing the polymer. In some embodiments, repairing comprises at least partially reforming a dynamic network of functional groups comprising at least one ester, at least one —OH, and at least one tertiary amine.

In another embodiment of the disclosure the cured epoxy vitrimer can be heated to temperature ranges from 120 to 200° C. to induce repairability of the cured epoxy vitrimer.

One embodiment disclosed herein is an ambient temperature curable and repairable epoxy vitrimer based on the curing of a mixture of glycidyl ester epoxy based on vegetable oil (HOEP) and a glycidyl ether of bisphenol A epoxy resin (DER) with DETA (an aliphatic amine hardener) as the hardener. The resulting cross-linked network possesses abundant ester bonds, hydroxyl groups, and tertiary amines (FIG. 1). DTER took place effectively at elevated temperatures (>120° C.). The cured epoxy exhibited typical vitrimer behaviors such as stress relaxation and repairing properties. The curing system was assessed for ambient temperature coating on tin plates. After curing at ambient temperature for 48 h, the resulting coating showed comparable adhesion, hardness, and solvent resistance properties to that of the DETA cured bisphenol A di-glycidyl ether epoxy resin (DER) which is a representative commercial coating with high $T_g$ and stiffness.

Articles of Manufacture

It can be appreciated that the resin compositions and resultant polymer compositions of the present disclosure can be used for a variety of applications. For example, in some embodiments, the resin composition and/or polymer composition coated onto a substrate. In more specific embodiments, the substrate is metal, a polymer, plastic, a painted surface, wood, rubber, glass, rock/mineral (e.g., granite, limestone), concrete, asphalt, pavement, and the like. The substrate may be organic, inorganic, or a combination thereof. In some embodiments, the resin composition and/or polymer composition coated onto flooring, walls, surfboards, snowboards, skis, water skis, inner tubes, sleds, skates, roller blades, skateboards, automobiles, bikes, planes, trains, tires, toys, furniture, household items, cutlery, smart phones, tables, computers, light bulbs, appliances, military equipment, railways, sprockets, cables, components, wiring, eye glasses, chairs, bottles, cans, apparel, pet apparel, personal protective equipment, laboratory equipment, industrial equipment, tools, outdoor equipment, sports equipment, machinery, safety and security equipment, construction and agricultural equipment, and the like.

In some embodiments, the resin composition and/or polymer composition may be used as an additive in paint, polymer, plastic, silicon-based coating, powder, tar, sealant, caulking, and the like. In some embodiments, the resin composition and/or polymer composition can be used in combination with polyurethane coatings, epoxy coatings, alkyd coatings, zinc-rich coatings, acrylic coatings, polysiloxane coatings, and the like.

In some embodiments, the resin composition and/or polymer composition can be used alone as an architectural coating, an industrial coating, or a special purpose coating. In still other embodiments, the resin composition and/or polymer composition can be used in combination with other ingredients or coatings as an architectural coating, an industrial coating, or a special purpose coating.

Typical Procedures for the Preparation of Ambient Temperature Curable Coatings

Standard tin plates with a dimension of 120×50×0.28 mm were used as the coating substrates. The tin plates were polished by sandpaper (220-grit) and cleaned with DI water and isopropanol, respectively. The resin system was prepared as follows: under mechanical stirring, HOEP, DER, and TEOA as catalyst were mixed at room temperature. DETA as a curing agent was then added. The molar ratio of epoxy/NH was fixed at 1/1.25. When a homogeneous mixture was formed, epoxies were coated onto the tin plates. The thickness of the applied coating was 100±10 μm. The coatings were allowed to cure at room temperature (~23° C.) for a predetermined time.

One specific embodiment provides a method for preparing a temperature curable epoxy vitrimer resin, comprising heating an epoxy vitrimer at a temperature from 10-50° C.; and introducing the epoxy vitrimer to a curing agent. In some embodiments, the introducing includes mixing the epoxy vitrimer with the curing agent.

In some more specific embodiments, the curing agent comprises: a glycidyl ether epoxy and a glycidyl amine epoxy. In some embodiments, curing agent includes a catalyst. In more specific embodiments, the catalyst is in a weight percentage from 0 to 5 wt %, from 0.01 to 5 wt %, from 0.05 to 5 wt %, from 0.1 to 5 wt %, from 0.2 to 5 wt %, from 0.4 to 5 wt %, from 1 to 5 wt %, from 1 to 5 wt %, from 2 to 5 wt %, from 0.01 to 4 wt %, from 0.01 to 3.5 wt %, or from 2.5 to 4 wt %.

One embodiment provides a method for preparing a temperature curable epoxy vitrimer resin comprising heating an epoxy vitrimer at a temperature from 10-50° C.; and mixing the epoxy vitrimer with an amine or glycidyl ether epoxy. In some embodiments, the epoxy vitrimer is a glycidyl ester epoxy resin. In some embodiments, the epoxy vitrimer is made with a glycidyl ester epoxy and an aliphatic amine hardener. In some embodiments, the epoxy vitrimer comprises a clycidyl ether epoxy, a glycidyl amine epoxy, or combinations thereof. In some embodiments, the epoxy vitrimer comprises a catalyst. In some embodiments, the epoxy vitrimer comprises an aliphatic amine hardener and a catalyst. In more specific embodiments, the catalyst is in a weight percentage from 0 to 5 wt %, from 0.01 to 5 wt %, from 0.05 to 5 wt %, from 0.1 to 5 wt %, from 0.2 to 5 wt %, from 0.4 to 5 wt %, from 1 to 5 wt %, from 1 to 5 wt %, from 2 to 5 wt %, from 0.01 to 4 wt %, from 0.01 to 3.5 wt %, or from 2.5 to 4 wt %.

In more specific embodiments, the catalyst comprises zinc acetate, zinc acetylacetonate, triethanolamine, diazabicycloundecene, triazabicyclodecene, 4-dimethylaminopyridine or combinations thereof. In some embodiments, the catalyst is zinc acetate. In certain embodiments, the catalyst is zinc acetylacetonate. In some embodiments, the catalyst is triethanolamine. In more specific embodiments, the catalyst is diazabicycloundecene. In certain embodiments, the catalyst is triazabicyclodecene. In some embodiments, the catalyst is 4-dimethylaminopyridine.

In some embodiments the epoxy vitrimer comprise 50-100 wt % in the total weight and the sum of a glycidyl ether epoxy content and a glycidyl amine epoxy content constitutes 50 to 0 wt % in the total mixture. In other embodiments, the epoxy vitrimer comprise 40-90 wt % in the total weight and the sum of a glycidyl ether epoxy content and a glycidyl amine epoxy content constitutes 50 to 0.1 wt % in the total mixture. In other embodiments, the epoxy vitrimer comprise 60-95 wt % in the total weight and the sum of a glycidyl ether epoxy content and a glycidyl amine epoxy content constitutes 40 to 10 wt % in the total mixture.

In some additional embodiments, the epoxy vitrimer is heated to a temperature range from 120 to 200° C. to induce repairability. In more specific embodiments, the polymer composition is heated at a temperature ranging from 120-200° C. to induce repairability.

Characterizations $T_g$ values and the curing behavior were examined using a Differential Scanning Calorimeter (DSC1, Mettler-Toledo, Switzerland). The sample (~5 mg) was sealed in a 40 μL aluminum crucible and heated from −50 to 200° C. at a rate of 5 K $min^{-1}$ under a nitrogen atmosphere. Thermal stability was examined using a thermogravimetric analyzer (TGA, Mettler-Toledo, Switzerland). The sample (~10 mg) was added into a ceramic crucible and heated from 50° C. to 800° C. at a heat rate of 10 K $min^{-1}$ under a nitrogen atmosphere.

The viscosity of the sample was examined using a Discovery HR-2 rheometer (TA Instruments) equipped with a pair of 25 mm disposable parallel plates. The sample was scanned at 30° C. with a frequency of 10 rad $s^{-1}$ and a constant strain of 0.5%. The stress relaxation behavior was measured using the same rheometer equipped with a pair of 8 mm parallel plates. The sample with uniform thickness was heated to the set temperature and equilibrated for 10 min. A constant force of 2 N was then loaded to ensure good contact of the sample with the parallel plate. During the test, a 3% strain was applied to the sample, and the change of relaxation modulus with time was recorded.

The swelling ratio and gel content were determined according to ASTM D2765-16 standard. The sample (0.500±0.05 g, $W_s$) was wrapped in a filter paper and extracted with toluene in a Soxhlet extractor. After refluxing for 12 h, the extracted sample was collected, and the solvent remaining on the surface of the sample was removed by a filter paper. The swollen sample was weighed and recorded as $W_g$. The swollen sample was subsequently dried in a vacuum oven at 100° C. until reaching a constant weight, and the dry weight of the extracted sample was recorded as $W_d$. The swelling ratio and gel content were calculated according to the following equations:

$$\text{Swelling ratio}=1+K(W_g-W_d)/W_d \quad (1)$$

$$\text{Gel content}=W_d/W_s\times 100 \quad (2)$$

Dynamic mechanical properties were determined using a dynamic mechanical analyzer (Q800 DMA, TA Instrument) in a single cantilever mode. The specimen with a dimension of ~35.0 mm×12.8 mm×3.0 mm was scanned from 0 to 170° C. at a heating rate of 3° C. $min^{-1}$. The oscillation amplitude was set at 15 μm, and the frequency was 1 Hz. The tensile properties of the samples were measured on an Instron 4466 test machine according to ASTM D638 standard. The crosshead speed was set at 1 mm $min^{-1}$. The impact strength was measured using a basic pendulum impact tester (TTE-3097, Dynisco BPI) according to ASTM D256. At least five repeats were tested for each sample.

Characterizations of the coating related properties are described as follows. The adhesion property of the coating was measured according to ASTM D3359-17 standard. A lattice pattern with six cuts in each direction was made by cutting through the coating using a sharp blade. Subsequently, a standard pressure-sensitive tape was used to pull off the lattice pattern. 5B level represents the highest adhesion level that no coated area is peeled off. 0B level represents the lowest adhesion level, in which over 65% of the coated area is peeled off. The hardness of the coating was measured by the pencil test according to the ASTM D3363 standard. A set of standard wood pencils of different hardness (from 6B to 6H) were used for the test. The hardest pencil that cannot cut through the coating was recorded as gouge hardness, and the hardest pencil that cannot scratch the coating was recorded as scratch hardness. The solvent resistance of the coating was determined according to ASTM D5402-15 standard (method A). Water, ethanol and methyl ethyl ketone (MEK) were used to rub the coating, respectively. One forward and back motion was considered as one double rub. The number of double rubs was recorded until the substrate was exposed or 400 double rubs reached.

Curing of HOEP alone with DETA resulted in a cross-linked polymer of relatively low modulus and glass transition temperature ($T_g$) due to the flexible backbone structure of the epoxy compound. In this study, HOEP was used together with a commercial bisphenol A epoxy (DER). As expected, the viscosity decreased with the HOEP content in the HOEP/DER resin system. For example, the viscosity was remarkably reduced from 10.9 Pa-s for DER to 1.7 Pa-s for the mixed epoxy resin containing only 25.7 wt % HOEP.

Figure 7:
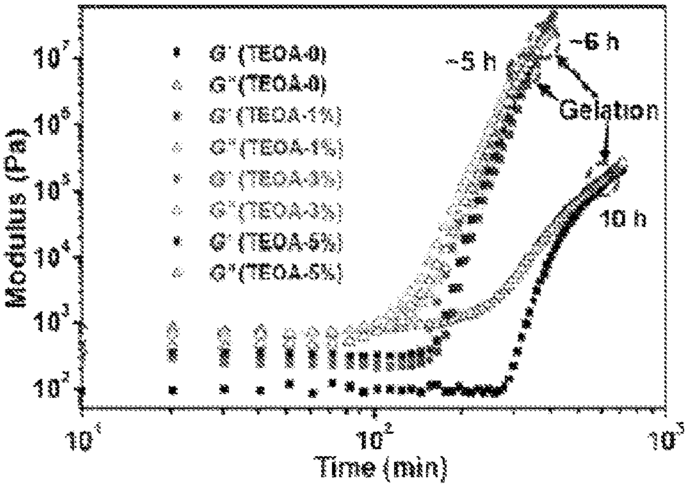
FIG. 7 shows the effect of triethanolamine (TEOA) loading on the rheological behavior of HOEP/DER-4/6 during curing at 23° C.

Diethylenetriamine (DETA), an aliphatic amine hardener, was used to cure the epoxy resins. Theoretically, each reactive hydrogen (NH) of an amine group can react with one epoxy group. However, compared with the primary amine, the secondary amine exhibits lower reactivity that is mainly due to the steric hindrance effect. In this study, the molar ratio of epoxy group to NH was fixed at 1/1.25, because the cured material prepared with this ratio exhibited the highest $T_g$ among all compositions. Without a catalyst, the reaction of epoxy-amine could not efficiently take place, as it took over 10 h for the curing system to reach the gelation point which is defined as the intersection of G' and G" curves from the rheological test as seen in FIG. 7. To accelerate the curing reaction, triethanolamine (TEOA) that was miscible with the epoxy curing system was used as a catalyst. It is well known that both the —OHs and tertiary amine of TEOA efficiently catalyzed curing reaction of the epoxy-amine system. As shown in FIG. 7, when 3 mol % TEOA (on the basis of epoxy group) was added to the formulation, the gelation time at room temperature was reduced from ~10 h to ~5 h. However, a further increase in TEOA loading did not shorten the gelation time. Therefore, 3 mol % TEOA was applied in the subsequent study.

Based on the molar ratio of epoxy groups between HOEP and DER, the samples were denoted as HOEP/DER-10/0, -8/2, -6/4, -4/6, -2/8, and -0/10, respectively. The epoxy was cured at 23° C. for 48 h and 190° C. for 3 h. As the HOEP loading increased, gel content decreased but swelling ratio increased. These results indicate that the cross-link density of the cured epoxies decreases with HOEP content. TGA results indicate that the 5% weight loss temperature ($T_{d5}$) for all samples exhibited at above 200° C., suggesting the thermal degradation during the following stress relaxation and repairing test at high temperature of 180-200° C. is negligible. As the increase in HOEP loading, $T_{d5}$ shifted from 324 to 266° C. This was probably attributed to the decreased cross-linked density and the increased amount of less stable ester bonds in the network structure.

Figure 8A:
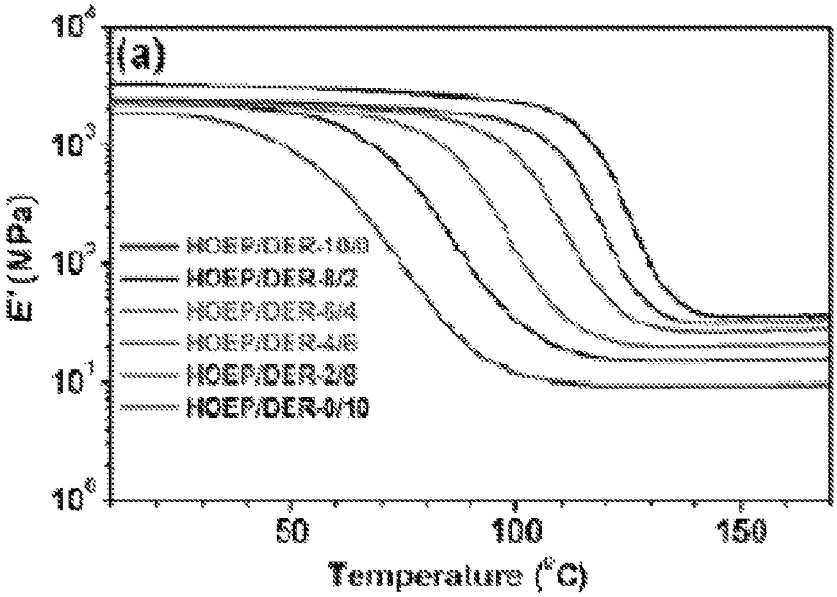
FIG. 8A-D show the effect of HOEP content on storage modulus (E') (FIG. 8A), tan δ curves (FIG. 8B), stress-strain curves (FIG. 8C), and impact strength of the post-cured epoxies (FIG. 8D). In this curing system, HOEP is a triglycidylester of fatty acid based on hempseed oil, and DER is a trade name of a bisphenol A diglycidyl ether epoxy resin. Based on the molar ratio of epoxy groups between HOEP and DER, the samples are denoted as HOEP/DER-10/0, -8/2, -6/4, -4/6, -2/8, and -0/10. Diethylenentriamine (DETA) is used as curing agent, and the molar ratio between epoxy groups and active hydrogen groups is 1/1.25.
Figure 8B:
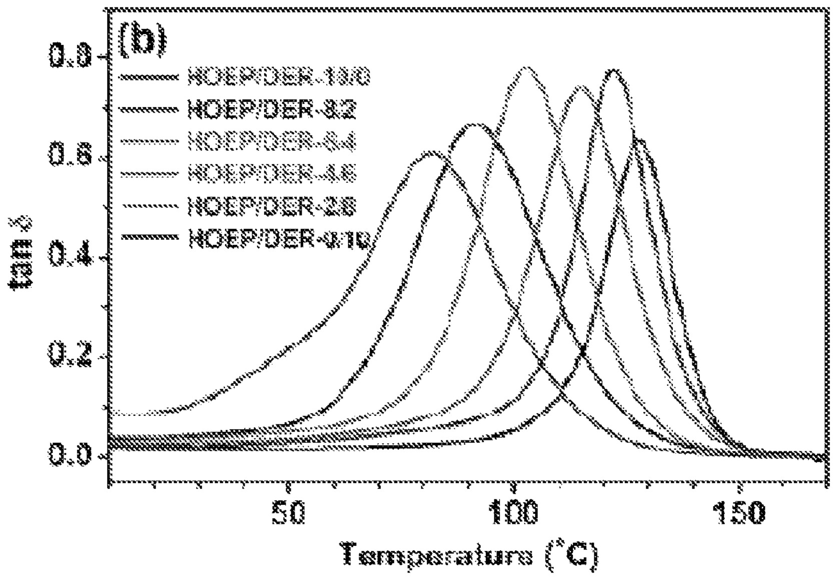

FIG. 8A shows the storage modulus (E') vs temperature curves of the post-cured epoxies from DMA test. All compositions exhibited a one-step drastic drop associated with the transition from glassy state to rubbery state. At glassy state (25° C.), the E' of DETA cured DER (HOEP/DER-0/10) was 3.1 GPa. The E' of HOEP/DER-2/8 decreased to 2.5 GPa, due to the soft backbone structure flexibilized the cross-linked network. Further increase in the HOEP content only slightly decreased the E'. The E' values of HOEP/DERs-2/8, -4/6, -6/4, and -8/2 were at a similar level ranging from 2.5 GPa to 2.1 GPa. The cured epoxy without DER epoxy (HOEP/DER-10/0) only exhibited an E' of 1.6 GPa which was significantly lower than the cured epoxies containing both HOEP and DER epoxy. In addition, the E' at rubbery state which is proportional to the cross-link density of the network decreased regularly as the increase in HOEP content, which is consistent with the results from the solvent extraction test. HOEP possessed long carbon chains and lower epoxy value that DER epoxy, so increase in HOEP loading in the resin system would increase the average distance between two cross-links of the network structure resulting in the decease of cross-link density. FIG. 8B shows the tan S curves. As the increase in HOEP content, the peak shifted to lower temperature correlating to the decrease of $T_g$, because the linear aliphatic backbone of HOEP flexibilized the cross-linked network. At higher HOEP content, the peak became broader, which could be related to the complicated structure of HOEP originally derived from a mixture of fatty acids making the network structure less uniform.

Figure 8C:
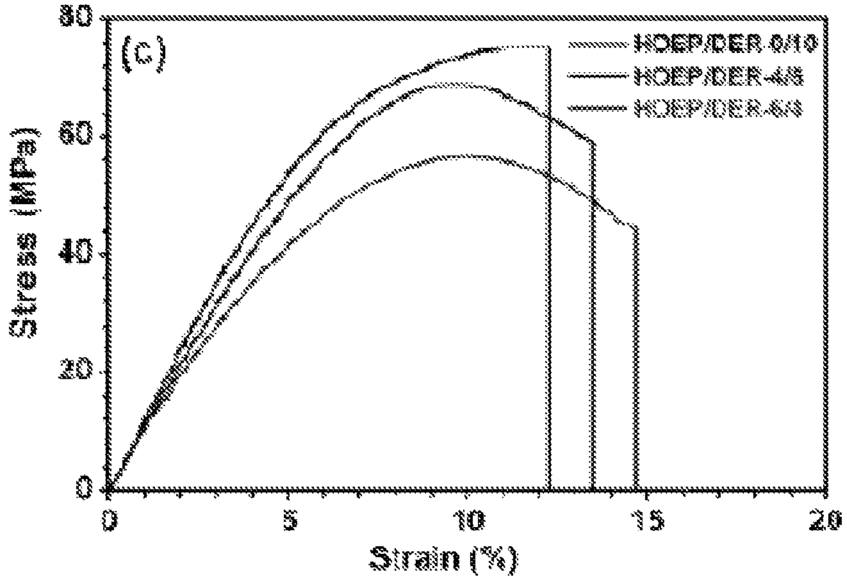
Figure 8D:
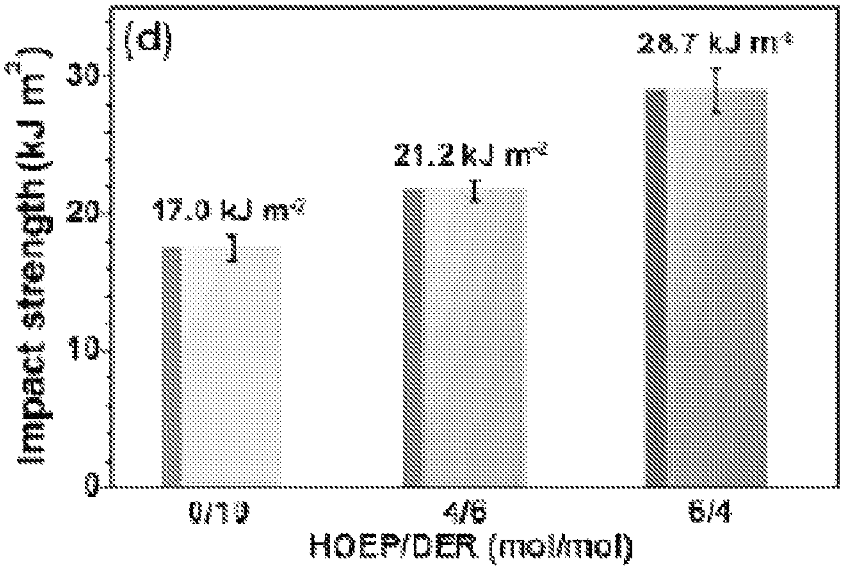

FIG. 8C shows the stress-strain curves of the cured epoxies. Considering the factors of $T_g$, cross-linked density, and bio content, HOEP/DERs-4/6 and -6/4 were mainly investigated in this section. The cured HOEP/DERs-8/2 and -10/0 exhibited relatively low $T_g$, modulus, and cross-linked density which may limit their practical applications. HOEP/DER-0/10 as a reference exhibited a tensile strength of 75.4 MPa. The tensile strength of HOEP/DER-4/6 and HOEP/DER-6/4 was 69.0 MPa and 54.8 MPa, respectively. In addition, HOEP/DER-0/10 exhibited a brittle failure, while a clear yield point was observed for both HOEP/DERs-4/6 and -6/4, indicating their better toughness, which was further confirmed by their impact strength as seen in FIG. 8D. The impact strengths of HOEP/DERs-4/6 and -6/4 were respectively 20.9 kJ $m^{-2}$ and 28.7 kJ $m^{-2}$, which were much higher than that of HOEP/DER-0/10 which exhibited an impact strength of 12.8 kJ $m^{-2}$. As a result, the addition of HOEP slightly lowered the tensile strength but significantly improved the toughness of the cured epoxy.

Dynamic Interchange Reactions within the Cross-Linked Network at Elevated Temperature The reaction of epoxy and aliphatic amine hardener results in the formations of —OH and C—N bonds. Therefore, amine cured glycidyl ether type BPA epoxies are chemically and thermally stable. If a glycidyl ester-type epoxy is reacted with an aliphatic amine hardener, the resulting cross-linked network will contain —OH groups and ester bonds available for DTER and may exhibit vitrimer behaviors when the contents of these functional groups are sufficiently high in the system.

Figure 9A:
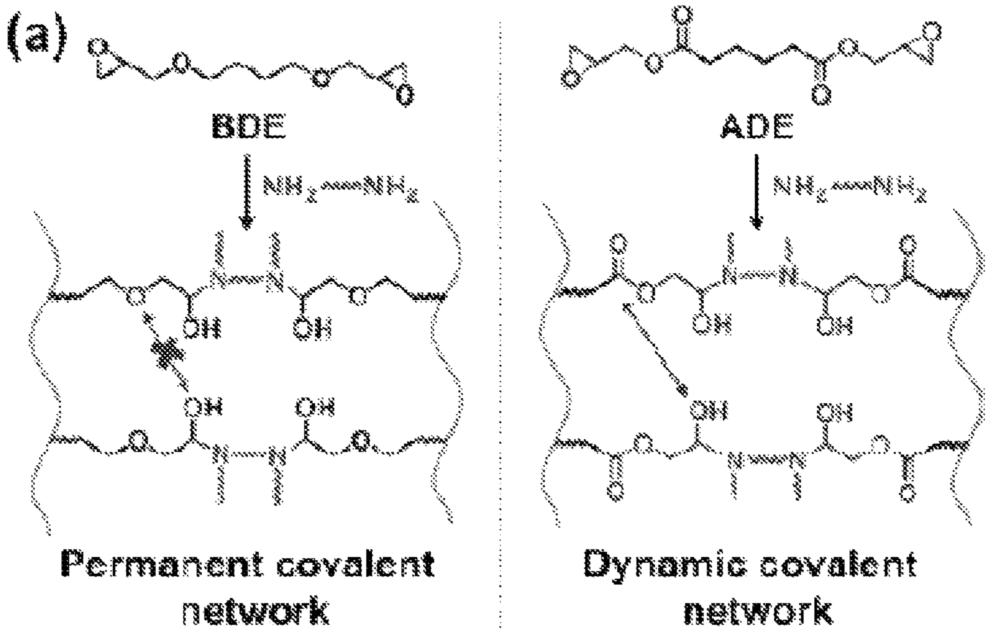
FIG. 9A-B show the permanent covalent network and dynamic covalent network are prepared from the curing reactions of 1,4-butanediol diglycidyl ether (BDE) and adipic acid diglycidyl ester (ADE) with DETA, respectively (FIG. 9A); stress relaxation curves of the epoxy films cured at room temperature for 24 h and post-cured at 190° C. for 3 h (FIG. 9B).
Figure 9B:
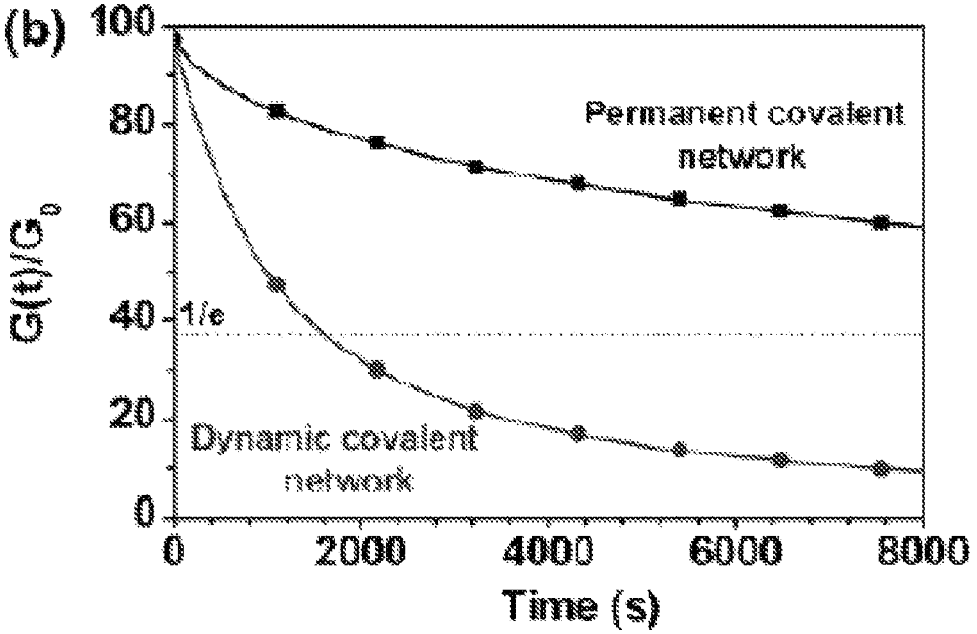

A glycidyl ester-type epoxy, 1,4-butanediol diglycidyl ether (BDE) and a diglycidyl ether-type epoxy, adipic acid diglycidyl ester (ADE), were used as two model epoxies and cured with DETA for comparison as seen in FIG. 9A. BDE and ADE both have aliphatic linear molecular chains of approximately same lengths. The DTER within the cross-linked network can be indirectly detected obtained by stress relaxation test which examines the decrease of internal stress induced by an external applied strain to the sample. The relaxation time (τ) is defined as the internal stress relaxes to 37% or 1/e of the initial stress. FIG. 9B shows the stress relaxation curves of the cured BDE and ADE at 180° C. Because the stress relaxation test was performed at 180° C. at which cross-linking reaction in the room temperature cured sample would likely continue to compromise the relaxation process, a post-curing process at 190° C. for 3 h was applied to those samples subjected to the relaxation test. The relaxation of the cured ADE is much faster than that of the cured BDE. The stress of the cured ADE relaxed to 37% at ~1700 s and 10% at 8000 s of the initial stress. In contrast, the cured BDE only relaxed to 53% at 21000 s. The fast stress relaxation of the cured ADE is because it contains abundant ester bonds and —OHs available for DTER. In contrast, there are no ester bonds in the cured BDE to induce the DTER, so only slow stress relaxation was observed. This relaxation phenomenon of the cured BDE was related to the hydrogen bonding and/or free volume in the network structure causing minor plastic deformation of the materials.

Figure 10A:
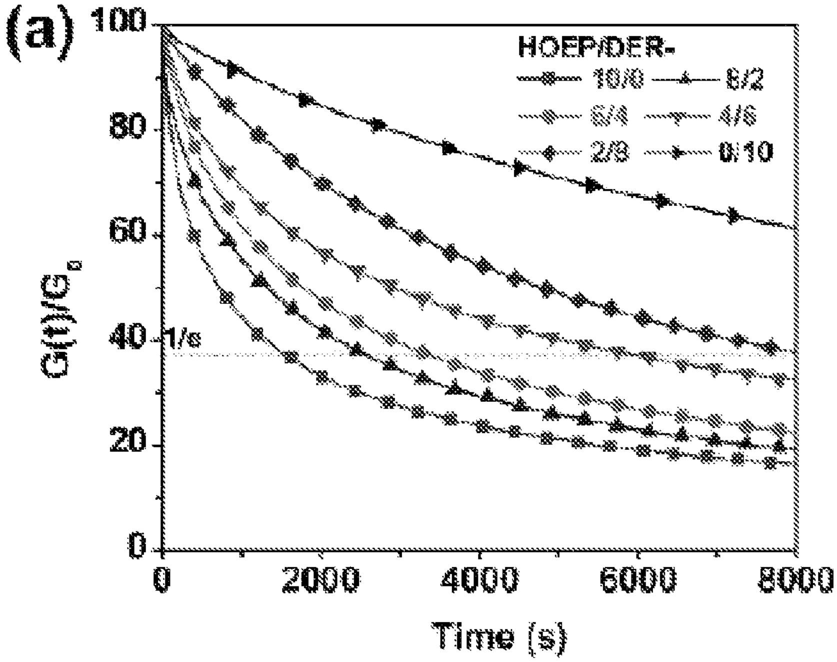
FIG. 10A-B show the stress relaxation curves of different HOEP/DER compositions (FIG. 10A); stress relaxation curves of the HOEP/DER-4/6 at different temperatures (FIG. 10B). Test samples were cured at room temperature for 24 h and then postcured at 190° C. for 3 h.
Figure 10B:
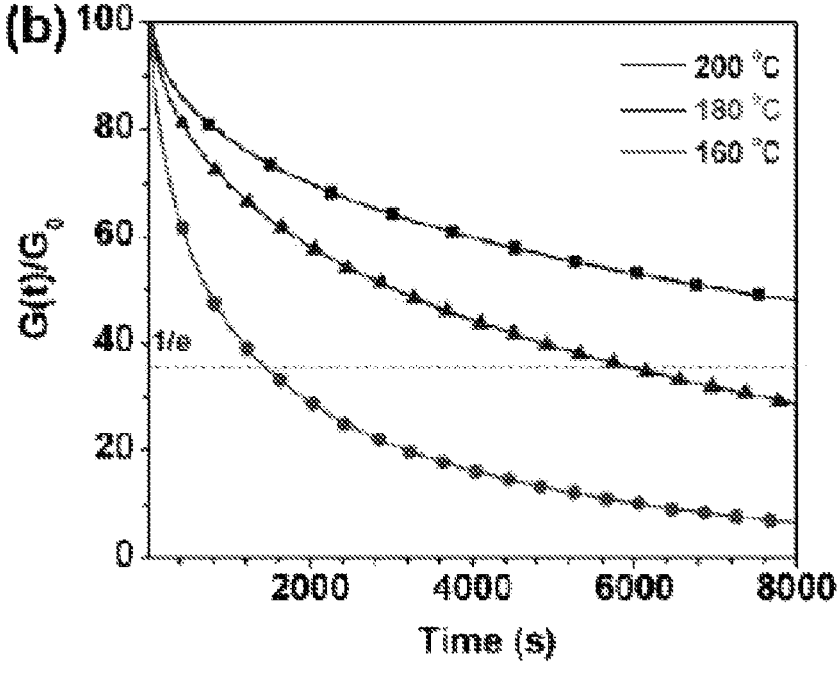

Similarly, when the glycidyl ester-type epoxy, HOEP and a BPA epoxy (DER) were used together to cure with DETA, notable stress relaxation was observed. FIG. 10A shows the stress relaxation curves of the cured HOEP/DER epoxies at 180° C. Because there were no ester bonds in the network structure of HOEP/DER-0/10, its relaxation rate was slow which was consistent with the relaxation result of the cured BDE. As the HOEP content increased, the relaxation of the resulting materials became faster. For example, the cured HOEP/DER-2/8 exhibited a $\tau$ of ~7600 s; in contrast, the $\tau$ of the HOEP/DER-10/0 without DER epoxy in the composition was as short as ~1900 s. The continuous increase of relaxation rate with increase in HOEP loading was due to the following reasons: (1) the increase in ester bonds originated from HOEP in network structure accelerate the DTER within the network structure; (2) the soft backbone structure of HOEP increased the mobility of polymer chains, which could also promote the DTER and relaxation. FIG. 10B shows the effect of temperature on the relaxation curves of HOEP/DER-4/6 at different temperatures. Stress relaxation rate increased with temperature increased, which was a consequence of accelerated DTER with increase in temperature.

The reparability of the post-cured coatings of HOEP/DER-4/6 and HOEP/DER-0/10 on tin plates (~23° C., for 24 h and 190° C. for 3 h) was compared. The coating was cut with a knife to make a scratch on the surface, and then the damaged coating was heated at 180° C. with an applied pressure of ~10 kPa. The healing of the scratch with heating was monitored using an optical microscope. As shown in the optical micrograph in FIG. 11A, after heating for only 10 min, the scratch of HOEP/DER-4/6 changed from 73 μm to 11 μm, an approximate ~85% recovery, indicating the excellent repairing ability. In contrast, no obvious repairing phenomenon was observed for the tin plate coated with HOEP/DER-0/10 as shown in the optical micrograph in FIG. 11B. The scratch exhibited little change from 82 μm to 78 μm due to lacked ester bonds for DTER. It is noted that HOEP/DER-4/6 exhibited a much shorter repairing time (10 min) than the stress relaxation time (~100 min) at 180° C. This was because an axial pressure of ~10 KPa was applied to the sample during repairing, which promoted the flow of the sample and improved the repair efficiency.

Figure 11A:
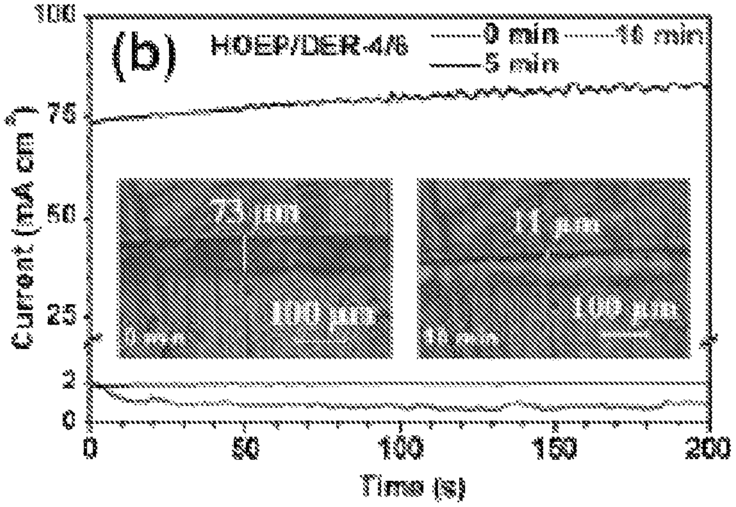
FIG. 11A-C show the scheme of the electrochemical test of the coating on the tin plate (FIG. 11C); electric current curves of HOEP/DER-4/6 (FIG. 11A) and HOEP/DER-0/10 (FIG. 11B) after repairing at 180° C. for different times. The inset images are the cracks on the coated films before and after repairing at 180° C. on a rheometer with a pressure of ~10 kPa. Prior to the test, the epoxy was coated onto a tin plate and cured at room temperature for 24 h and 190° C. for 3 h. The coating thickness was ~100 μm.
Figure 11B:
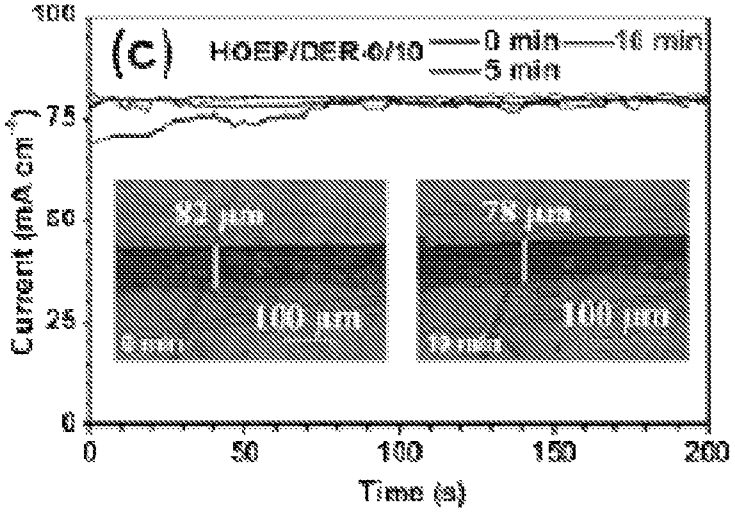
Figure 11C:
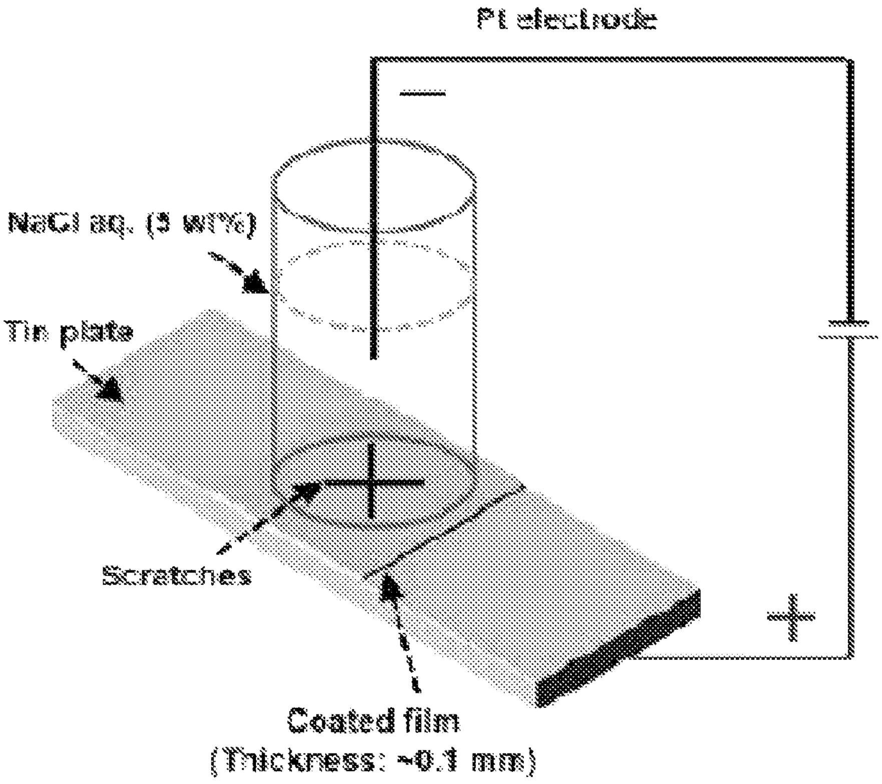

More evidence of the repairing property was provided by the electrochemical test using an electrochemical workstation. During the test, the coated tin plate and a platinum electrode respectively served as working and counter electrodes, and 5% NaCl solution served as the electrolyte as shown FIG. 11C. A voltage of 3 V was applied, and the change of current with time was recorded. In the beginning, the coating was cut through to the substrate, so the current directly passed through the tin plate and exhibited a current of ~80 mA $cm^{-2}$. As shown in FIG. 11A, after heating the coated tin plate at 180° C. for 10 min, almost no current was detected for the tin plate coated with HOEP/DER-4/6, which is because the coating was repaired and prevents the current from passing through the tin plate. In contrast, as shown in FIG. 11B, the current detected from the tin plate coated with the damaged HOEP/DER-0/10 almost remained unchanged after heating for 10 min, suggesting the coating was not repaired.

Ambient Temperature Coatings with Repairability

Figure 12A:
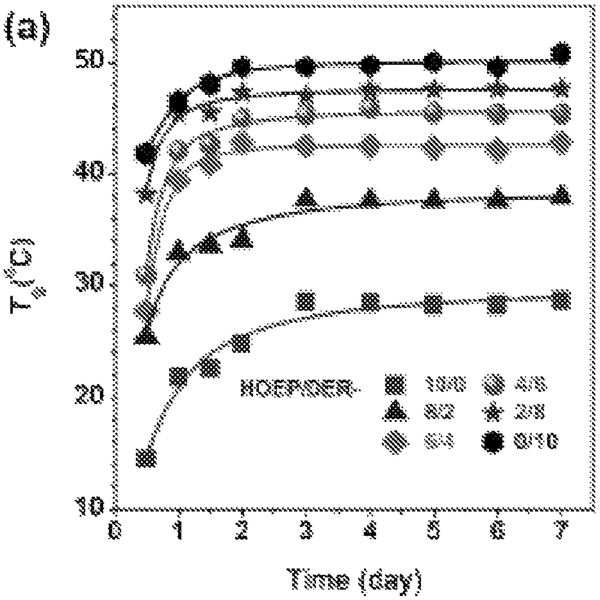
FIG. 12A-D show $T_g$ (FIG. 12A), gouge hardness (FIG. 12B), scratch hardness (FIG. 12C), tape adhesion (FIG. 12D) of epoxy coatings after curing at 23° C. for different reaction times.
Figure 12B:
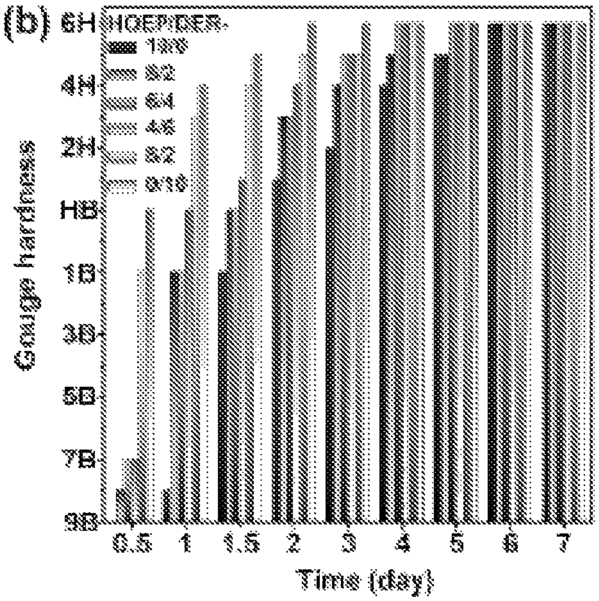
Figure 12C:
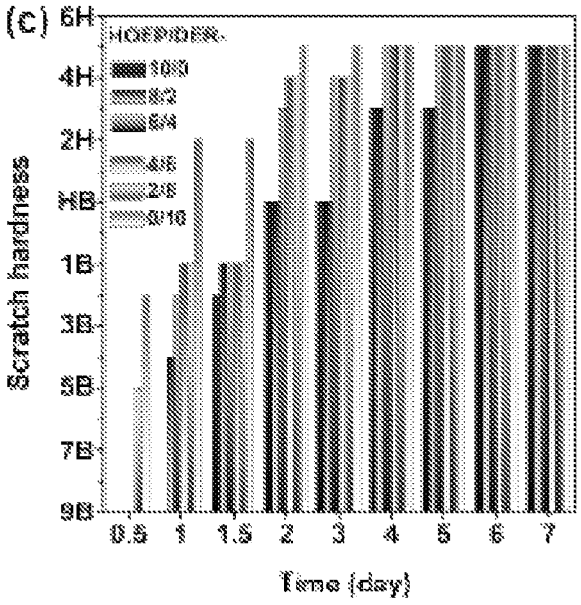
Figure 12D:
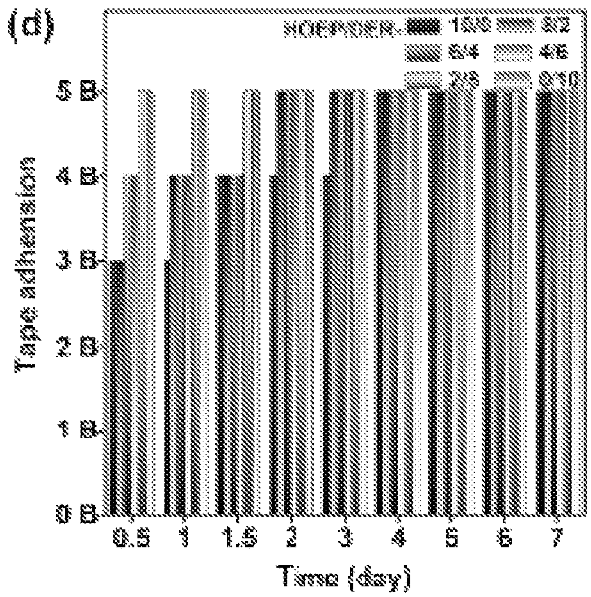

The use of the HOEP/DER vitrimers for ambient-temperature coating was investigated. FIG. 12A shows the changes of the $T_g$'s with reaction time for different HOEP/DER compositions cured at room temperature. The $T_g$'s of HOEP/DERs-6/4, -4/6, -2/8, and -0/10 continually increased with time and reached a steady value after reaction for 2 days. For the compositions with relatively high HOEP content (i.e., HOEP/DERs-10/0 and -8/2), it took more than 4 days for their $T_g$'s to reach steady values. The slow reaction rate at high HOEP loadings was due to the lower reactivity of HOEP than that of DER epoxy. The hardness of the coating was assessed by a scratch test (pencil hardness). FIGS. 12B and 12C show both gouge hardness and scratch hardness obtained using the pencil hardness tester increased with reaction time and then reached a steady level of 5H. It took 2 days for HOEP/DER-0/10 to reach the hardness level of 5H, 4 days for HOEP/DERs-4/6 and -2/8, and even more time for the other compositions with higher HOEP contents. Adhesion property was evaluated by tape test. FIG. 12D shows the changes of adhesion of the coatings as a function of curing time. Within 2 days of curing, the adhesion level of the cured HOEP/DERs except for HOEP/DERs-10/0 reached 5B which is the highest adhesion level. In commercial practice, the resin is required to achieve a decent $T_g$ (>40° C.), hardness, and adhesion after curing at room temperature within 3 days before moving things onto the coatings. Evidenced by the aforementioned results, HOEP/DER vitrimer satisfied these demands for the room-temperature coating. Moreover, the solvent resistance of the coatings was also investigated via the rub test, recording the number of rubs for each coating during the test. Water, ethanol, and methyl ethyl ketone were used as solvents, respectively. All the HOEP/DERs coatings exhibited the tolerance>400 rubs, indicating their satisfactory solvent resistance.

The degrees of curing and gel contents of HOEP/DER-0/10, 4/6 and 6/4 cured at room temperature for 7 days were investigated, recording the DSC heating thermograms of the samples before and after room temperature curing. The samples cured at room temperature for 7 days showed no obvious exothermic peaks, indicating a better completion of curing. The gel contents of the room temperature cured HOEP/DER-0/10, 4/6 and 6/4 were respectively 96.4, 96.1 and 94.2%, which were slightly lower but close to the values of the post-cured samples.

To investigate the repairability, the coatings obtained from the curing at room temperature for 7 days were scratched to have a crack on the surface, then the damaged coatings were repaired at 180° C. for different times. The widths of the scratch were recovered by ~87% and ~85% for HOEP/DER-4/6 and 6/4 within 10 min, respectively. After being heated for 30 min, the scratch of HOEP-6/4 was almost completely recovered. In contrast, no obvious change was observed during the repairing of the HOEP/DER-0/10 coating due to lack of ester bonds in the cross-linked network.

Based on the above results, HOEP/DERs-4/6 and -6/4 are more suitable for ambient temperature curable coatings.

Other Examples of Preparation of Ambient Temperature Curable Epoxy Vitrimer

RTE-1. Under stirring, 10 g fatty acid derived epoxy (epoxy value=0.38 mol/100 g), 11 g BPA epoxy resin (epoxy value=0.51 mol/100 g), 2.5 g diethylenetriamine, and 0.5 g triethanolamine were mixed in a 100 mL beaker at room temperature (23-25° C.). After a homogenous mixture was formed, it was poured into a mold with a dimension of 100 mm×150 mm×3 mm. The mixture was cured at room temperature (23-25° C.) for 3 days. After curing, the sample was removed from the mold.

RTE-2. Under stirring, 10 g fatty acid derived epoxy (epoxy value=0.38 mol/100 g), 6.5 g 4,4'-Methylenebis(N, N-diglycidylaniline) (epoxy value=0.87 mol/100 g), 3.0 g diethylenetriamine, and 0.5 g triethanolaraine were mixed in a 100 mL beaker at room temperature (23-25° C.). After a homogenous mixture was formed, it was poured into a mold with a dimension of 100 mm×150 mm×3 mm. The mixture was cured at room temperature (23-25° C.) for 3 days. After curing, the sample was removed from the mold.

RTE-3. Under stirring, 15 g rosin acid derived epoxy (epoxy value=0.27 mol/100 g), 11 g BPA epoxy resin (epoxy value=0.51 mol/100 g), 3.5 g triethylenetetramine, and 0.5 g diazabicycloundecene were mixed in a 100 mL beaker at room temperature (23-25° C.). After a homogenous mixture was formed; it was poured into a mold with a dimension of 100 mm×150 mm×3 mm. The mixture was cured at 50° C. for 12 hours. After curing, the sample was removed from the mold.

RTE-4. Under stirring, 8 g succinic acid derived epoxy (epoxy value=0.65 mol/100 g), 11 g BPA epoxy resin (epoxy value=0.51 mol/100 g), 2.0 g tris(2-aminoethyl)amine, and 0.5 g diazabicycloundecene were mixed in a 100 mL beaker at room temperature (23-25° C.). After a homogenous mixture was formed, it was poured into a mold with a dimension of 100 mm×150 mm×3 mm. The mixture was cured at 50° C. for 12 hours. After curing, the sample was removed from the mold.

Other Examples of Preparation of Epoxy Vitrimer Coating

Under stirring, 10 g fatty acid derived epoxy (epoxy value=0.38 mol/100 g), 11 g BPA epoxy resin (epoxy value=0.51 mol/100 g), 2.5 g diethylenetriamine, and 0.5 g triethanolamine were mixed in a 100 mL beaker at room temperature (23-25° C.). After a homogenous mixture was formed, the mixture was coated on a tin plate using a film applicator to control the coating thickness. The mixture was cured at room temperature (23-25° C.) for 3 days. The coating thickness was measured as 100±10 µm.

It should be emphasized that the above-described embodiments and following specific examples of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A resin composition comprising a glycidyl ester epoxy having the following structure:

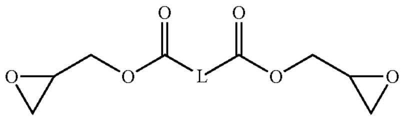

wherein:

L has one of the following structures:

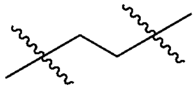

,

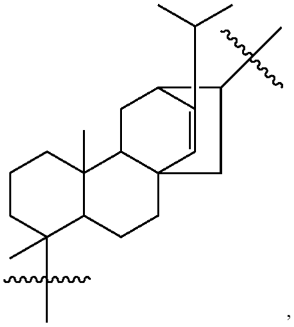

,

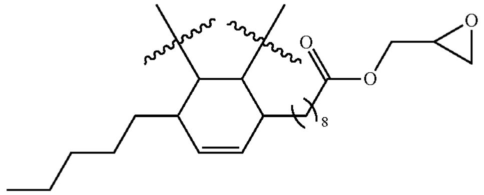

or

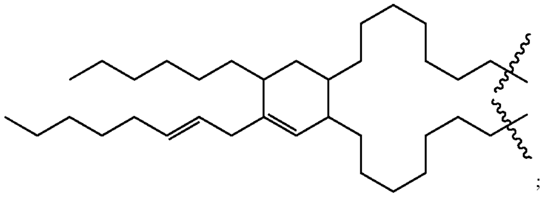

;

and an aliphatic amine hardener comprising isophorone diamine or a compound having the following structure:

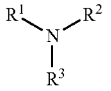

wherein:

$R^1$, $R^2$, and $R^3$ are each independently hydrogen, $-(CH_2)_nNH_2$, or $-(CH_2)_n-NH-(CH_2)_m-NH_2$, provided that one of $R^1$, $R^2$ and $R^3$ is not hydrogen n is 1, 2, or 3;

m is 1, 2, or 3; and a glycidyl ether epoxy having the following structure:

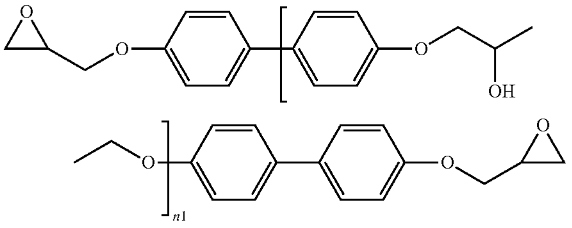

wherein:

n1 is an integer from 0-10; and a triethanolamine catalyst.

2. The resin composition of claim 1, wherein L has one of the following structures:

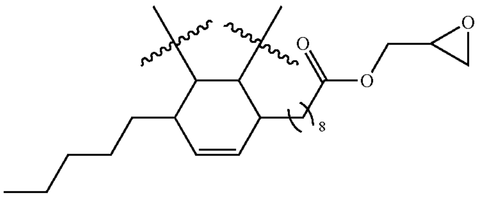

or

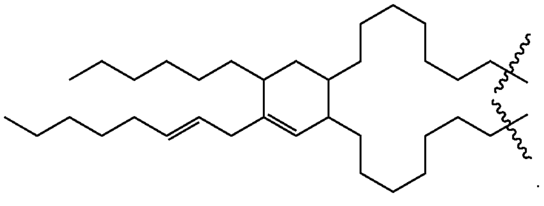

3. The resin composition of claim 1, wherein the glycidyl ester epoxy has the following structure:

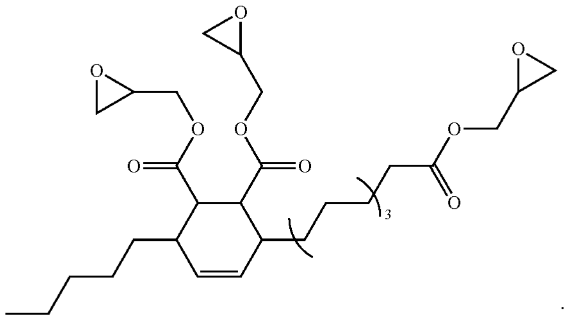

4. The resin composition of claim 1, wherein the aliphatic amine is triethylenetetramine, ethylenediamine, diethylenetriamine, tris-(2-aminoethyl)amine, isophorone diamine, or combinations thereof.

5. The resin composition of claim 1, wherein the resin composition further comprises a glycidyl amine epoxy.

6. The resin composition of claim 5, wherein the glycidyl amine epoxy has one of the following structures:

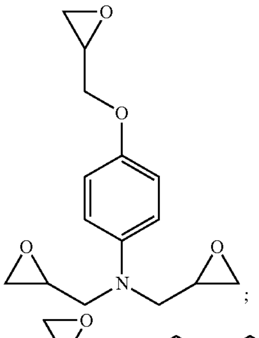

;

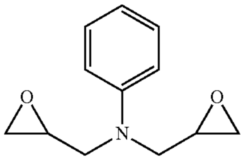

or

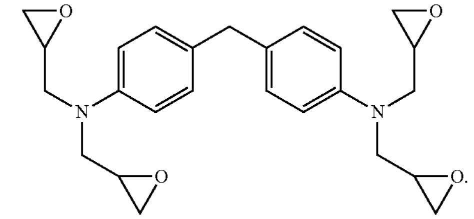

7. The resin composition of claim 1, wherein the resin composition further comprises a zinc acetate, zinc acetylacetonate, diazabicycloundecene, triazabicyclodecene, 4-dimethylaminopyridine, or combinations thereof.

8. The resin composition of claim 1, wherein the catalyst is present at a concentration ranging from about 0.1 to 5 wt % of the resin composition.

9. A polymer composition comprising a glycidyl ester substructure:

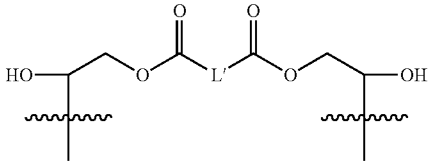

wherein:

L' has one of the following structures:

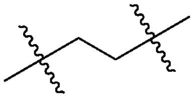

,

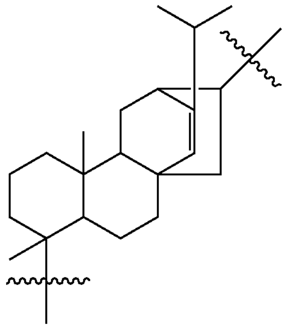

,

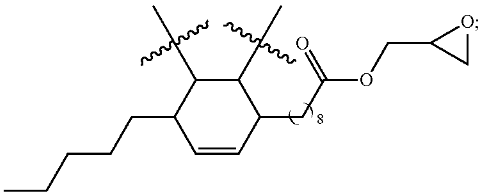

-continued

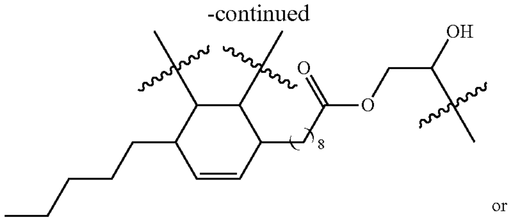

or

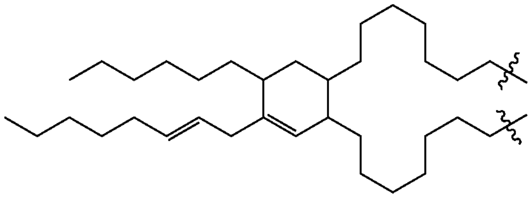

;

at least one tertiary amine having the following substructure:

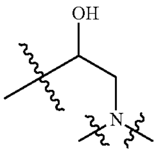

;

and at least one glycidyl ether epoxy having the following substructure:

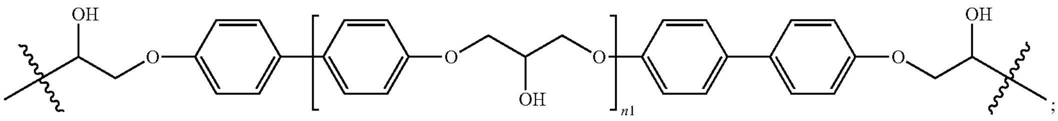

;

wherein:

n1 is an integer from 0-10; and a triethanolamine catalyst.

10. The polymer composition of claim 9, wherein L' has one of the following structures:

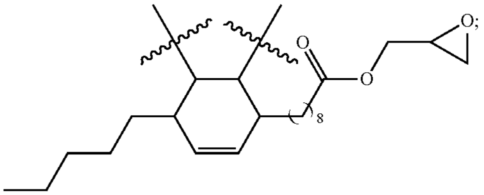

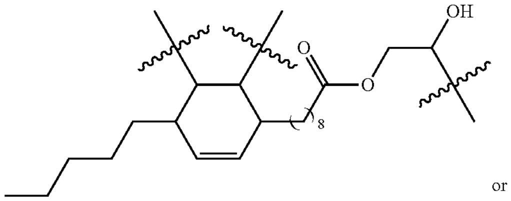

or

-continued

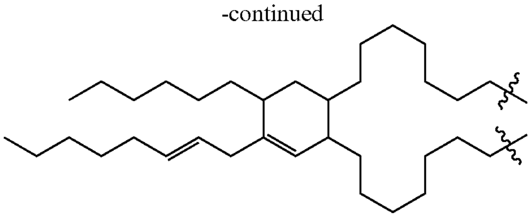

.

11. The polymer composition of claim 9, wherein the glycidyl ester substructure is:

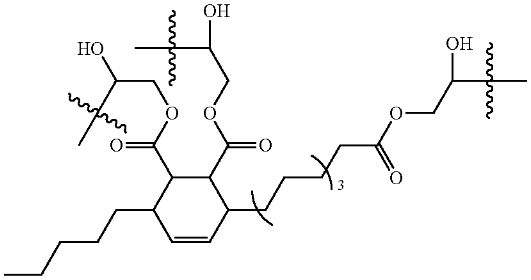

.

12. The polymer composition of claim 9, wherein the polymer composition further comprises one of the following substructures:

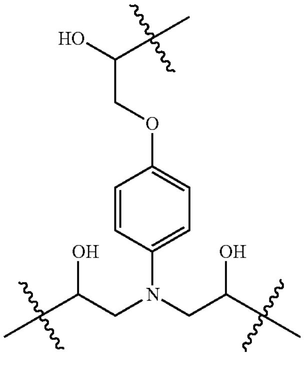

;

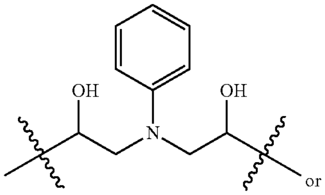

or

-continued

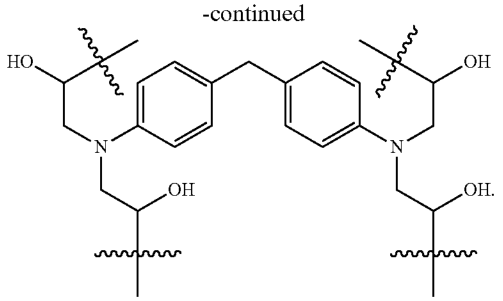

13. A method for preparing a polymer composition, the method comprising mixing a glycidyl ester epoxide having the following structure:

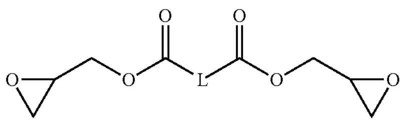

wherein:

L has one of the following structures:

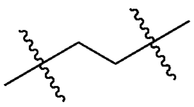

,

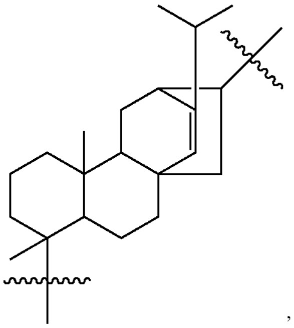

,

-continued

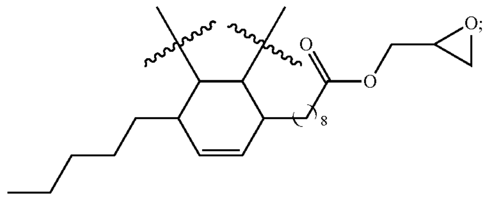

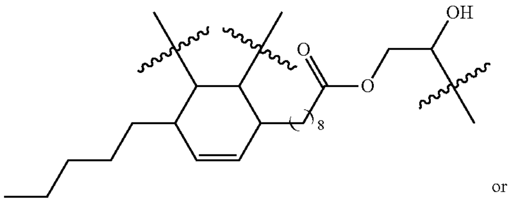

or

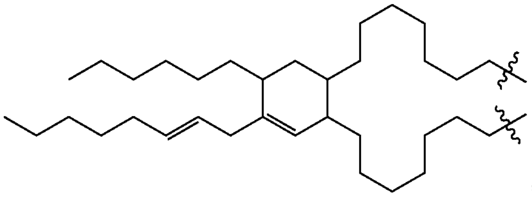

;

an aliphatic amine that is isophorone diamine or has the following structure:

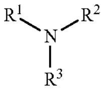

wherein:

$R^1$, $R^2$, and $R^3$ are each independently hydrogen, $-(CH_2)_nNH_2$, or $-(CH_2)_n-NH-(CH_2)_m-NH_2$, provided that one of $R^1$, $R^2$ and $R^3$ is not hydrogen n is 1, 2, or 3; and m is 1, 2, or 3; and a glycidyl ether epoxy having the following structure:

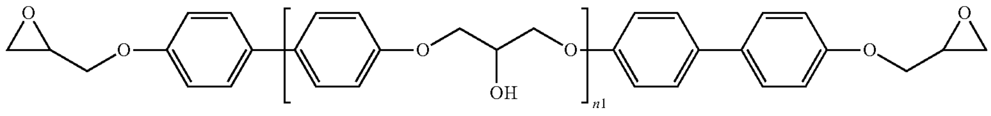

;

wherein:

n1 is an integer from 0-10; and a triethanolamine catalyst thereby forming a resin composition; and initiating a polymerization reaction thereby forming a polymer composition.

14. The method of claim 13, wherein the polymer composition comprises the following substructure:

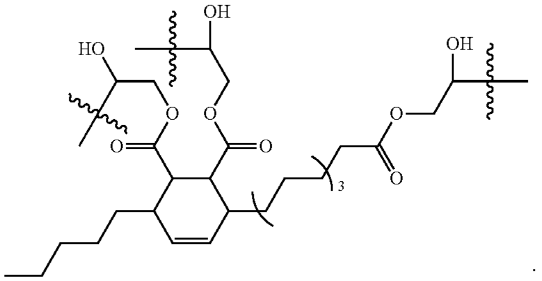

.

15. The method of claim 13, wherein the method further comprises adding compounds having one of the following structures

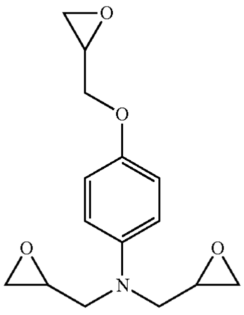

;

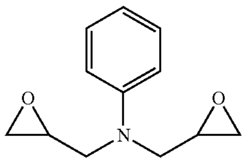

; or

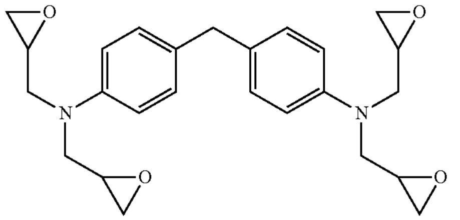

prior to initiating the polymerization.

16. The method of claim 13, wherein the initiating comprises heating the resin composition at a temperature ranging from 10-50° C. during mixing.

17. The method of claim 13, wherein the resin composition further comprises a zinc acetate, zinc acetylacetonate, diazabicycloundecene, triazabicyclodecene, 4-dimethylaminopyridine, or combinations thereof.

* * * * *